(12) United States Patent
Saul et al.

(10) Patent No.: US 8,176,434 B2
(45) Date of Patent: May 8, 2012

(54) VIRTUAL DESKTOP VIEW SCROLLING

(75) Inventors: Elton Saul, Kirkland, WA (US); Robert Wilhelm Schmieder, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 823 days.

(21) Appl. No.: 12/119,415

(22) Filed: May 12, 2008

(65) Prior Publication Data

US 2009/0282359 A1 Nov. 12, 2009

(51) Int. Cl.
*G06F 3/048* (2006.01)
*G06F 15/16* (2006.01)

(52) U.S. Cl. ......... 715/784; 709/203; 715/781; 715/804

(58) Field of Classification Search ................... 715/784; 709/203
See application file for complete search history.

(56) References Cited

U.S. PATENT DOCUMENTS

| | | | | |
|---|---|---|---|---|
| 5,495,566 | A * | 2/1996 | Kwatinetz | 715/785 |
| 5,874,936 | A * | 2/1999 | Berstis et al. | 715/785 |
| 5,929,840 | A * | 7/1999 | Brewer et al. | 715/862 |
| 6,252,579 | B1 * | 6/2001 | Rosenberg et al. | 715/856 |
| 6,268,855 | B1 * | 7/2001 | Mairs et al. | 715/784 |
| 6,437,803 | B1 | 8/2002 | Panasyuk et al. | 715/733 |
| 6,473,101 | B1 * | 10/2002 | Grigor et al. | 715/784 |
| 7,010,755 | B2 * | 3/2006 | Anderson et al. | 715/778 |
| 7,171,444 | B2 | 1/2007 | Deshpande | 709/203 |
| 7,325,040 | B2 | 1/2008 | Truong | 709/217 |
| 7,519,910 | B2 * | 4/2009 | Saka | 715/748 |
| 2002/0109668 | A1 * | 8/2002 | Rosenberg et al. | 345/156 |
| 2004/0145605 | A1 | 7/2004 | Basu et al. | 715/740 |
| 2004/0174398 | A1 * | 9/2004 | Luke et al. | 345/856 |
| 2005/0193082 | A1 | 9/2005 | Burns | 709/213 |
| 2005/0206585 | A1 * | 9/2005 | Stewart et al. | 345/34 |
| 2006/0142878 | A1 | 6/2006 | Banik et al. | 700/17 |
| 2006/0176294 | A1 * | 8/2006 | Vaananen | 345/419 |
| 2006/0218285 | A1 | 9/2006 | Talwar et al. | 709/227 |
| 2006/0230156 | A1 * | 10/2006 | Shappir et al. | 709/227 |
| 2007/0056009 | A1 | 3/2007 | Spilo et al. | |
| 2007/0143837 | A1 | 6/2007 | Azeez et al. | 726/11 |
| 2007/0176900 | A1 * | 8/2007 | Nagar | 345/159 |

OTHER PUBLICATIONS

PCT International Search Report mailed Dec. 24, 2009, in corresponding International Application No. PCT/US2009/038642.
Raeburn, D., "Running with the Big Guys . . . Soft Agency LLC's Remote Desktop v1.0," Pocketnow, http://www.pocketnow.com/index.php?a=portal_detail&t=review&id=231, 2002, 1-6.
"Raritan Multi-Platform Client Raritan Remote Client: MPC, RRC User Guide," Raritan Computer, Inc., http://www.raritan.com/_downloads/pdfs/products/MPC_RRC-0A-E.pdf, 2006, 1-66.
"Apple Remote Desktop: Administrator's Guide," Apple, http://images.apple.com/remotedesktop/pdf/AdministratorsGuide2006116.pdf, 2006, 1-191.

* cited by examiner

*Primary Examiner* — Namitha Pillai
*Assistant Examiner* — Matthew Ell
(74) *Attorney, Agent, or Firm* — Woodcock Washburn LLP

(57) ABSTRACT

Example embodiments of the present disclosure are related to scrolling the view of a virtual desktop on a client. The client can be in communication with a server that has a display driver. The server can be configured to transmit signals indicative of images to the client and the client can be configured draw the images in a virtual desktop. The client can be configured to render a view of the virtual desktop that includes a portion of the virtual desktop; track user input; and pan the view in response to the user input.

17 Claims, 16 Drawing Sheets

VIRTUAL DESKTOP VIEW SCROLLING

BACKGROUND

Remote computing systems enable users to access resources hosted by remote computers. In these systems the essential components are the client and the server. The server in this system executes programs and transmits signals indicative of a user interface to clients that connect using a communication protocol such as the TCP/IP protocol. Each connecting client is provided a session, e.g., an execution environment that includes a set of resources. Each client transmits signals indicative of user input to the server and the server applies the user input to the appropriate session.

Generally when a client connects to a server, the display driver(s) of the server may generate a user interface at a certain display resolution. In certain situations, the display resolution of the server may be higher than the display resolution of the client. Since in this architecture the user interface for the session is generated by the server and merely rendered by the client, the client would have to modify the display settings of the server in order to change how the session looks on their client.

In certain situations however modifying the display settings to accommodate a client may be undesirable. For example, the display of the server can be configured to render a user interface while the client is remotely connected for the purpose of providing technical support to a user or collaboratively work on a project with a user. If the display settings of the server were adjusted to accommodate the client then the user experience of an operator of the server would be diminished. In another situation the optimum resolution of the client may not be supported by the display driver of the server. In this situation modifying the display settings could potentially damage a physical display attached to the server.

Current techniques provide scrollbars, e.g., graphical widgets, to scroll a view of a user interface. As the scrollbar is moved the view of the user interface is panned. This technique however is cumbersome and interrupts the normal workflow. For example a user that wishes to drag a file from one end of a user interface to another must drag the file to the edge of the depicted portion of the UI, move the scroll bar over, and drag the file to the desired spot. In another example, a user that works with a user interface that spans across multiple physical monitors naturally moves their cursor from one monitor to another as they change the focus of their attention. Requiring a user to move a scrollbar to view different portions of a user interface interrupts this natural workflow. Thus, it would be desirable to provide a more naturally intuitive way to navigate a user interface.

SUMMARY

An example embodiment of the present disclosure describes a method that includes, but is not limited to generating, from geometry information received from a remote computer, a virtual desktop comprising a display resolution of a display driver of the remote computer; drawing graphics received from the remote computer in the virtual desktop; rendering a view of the virtual desktop, wherein the view is defined by edges and depicts a portion of the virtual desktop; and receiving relative cursor movement information. In addition to the foregoing, other aspects are described in the claims, drawings, and text forming a part of the present disclosure.

An example embodiment of the present disclosure describes a computer readable storage medium including computer readable instructions that include, but are not limited to instructions for rendering a view of a virtual desktop that depicts graphics received from a remote computer, wherein the view is defined by a range of pixels and the virtual desktop is defined by a range of pixels corresponding to a display resolution of a remote computer; instructions for receiving relative cursor movement information; instructions for determining, from the relative cursor movement information and the range of pixels that define the view, that a cursor has reached an edge of the view; instructions for scrolling a view of a virtual desktop in the direction of the relative cursor movement. In addition to the foregoing, other aspects are described in the claims, drawings, and text forming a part of the present disclosure.

An example embodiment of the present disclosure describes a computer system that includes, but is not limited to circuitry for rendering a view of a virtual desktop, wherein the virtual desktop is defined by first a first pixel range that corresponds to a display resolution of a remote computer and the view is defined by a second pixel range; circuitry for receiving cursor movement information; circuitry for determining from the cursor movement information and the second pixel range, that a cursor has reached an edge of the second pixel range; and circuitry for scrolling the view in the direction of the cursor movement. In addition to the foregoing, other aspects are described in the claims, drawings, and text forming a part of the present disclosure.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
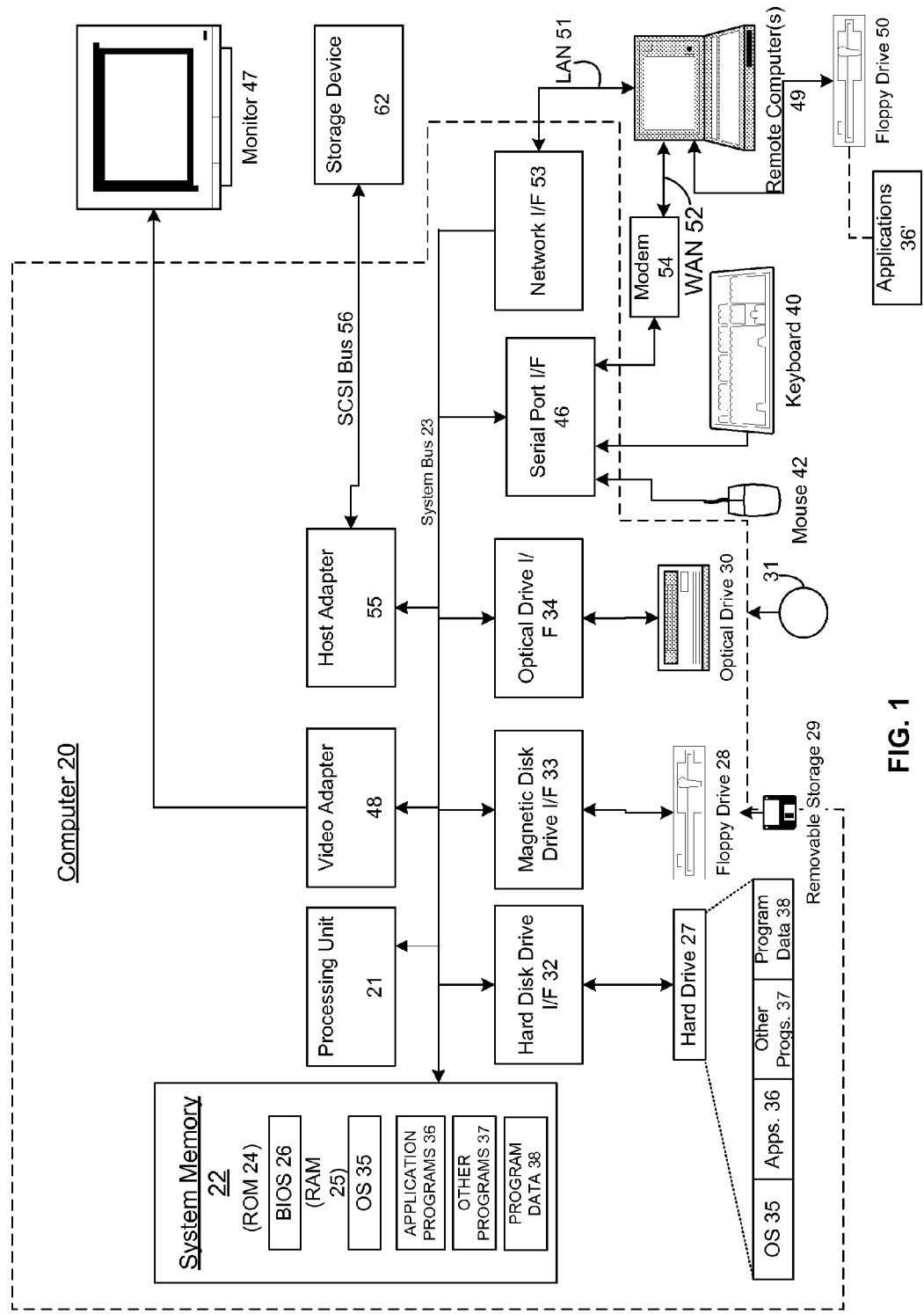
FIG. 1 depicts an example computer system wherein aspects of the present disclosure can be implemented.

Numerous embodiments of the present disclosure may execute on a computer. FIG. 1 and the following discussion is intended to provide a brief general description of a suitable computing environment in which the disclosure may be implemented. One skilled in the art can appreciate that the computer system of FIG. 1 can in some embodiments effectuate the server 204 of FIG. 2 and the client 201 of FIG. 3. In these example embodiments, the server 204 and client 201 can include some or all of the components described in FIG. 1 and in some embodiments the server 204 and client 201 can include circuitry configured to instantiate specific aspects of the present disclosure. For example, the term circuitry used through the disclosure can include specialized hardware components configured to perform function(s) by firmware or switches. In other example embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically can include many or all of the elements described above relative to the personal computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the personal computer 20 can be connected to the LAN 51 through a network interface or adapter 53. When used in a WAN networking environment, the personal computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

Figure 2:
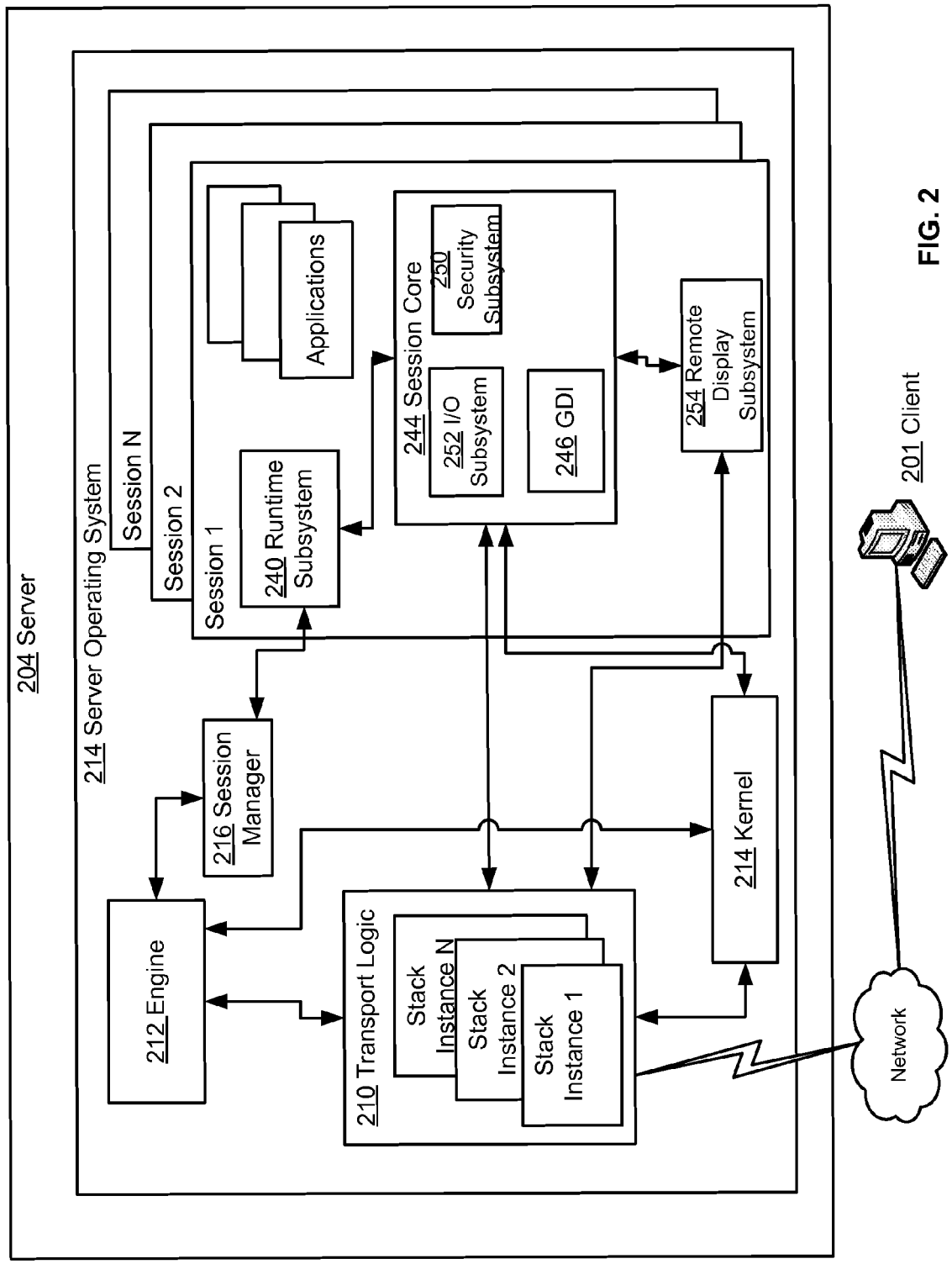
FIG. 2 depicts an example terminal server wherein aspects of the present disclosure can be implemented.
Figure 3:
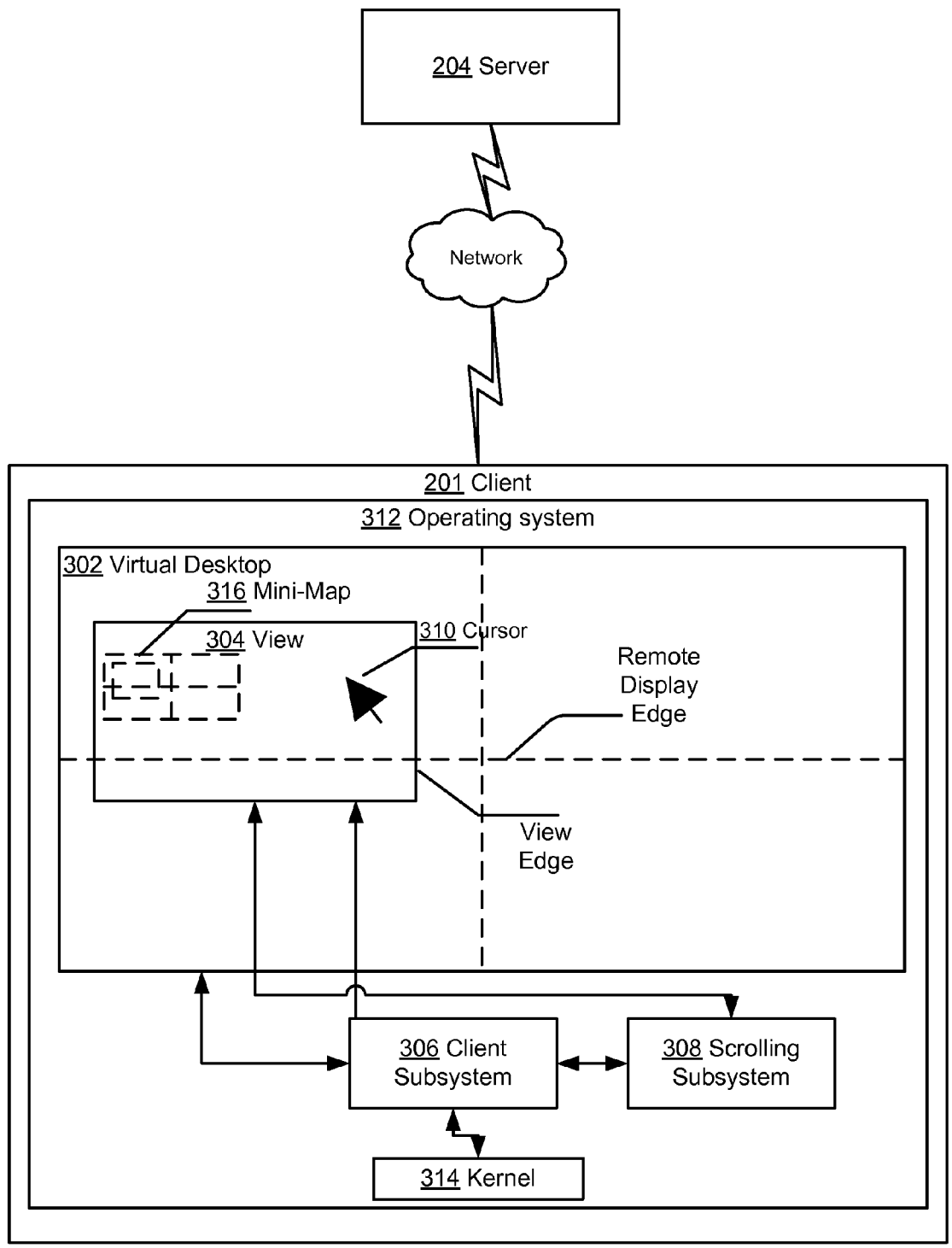
FIG. 3 depicts an example client wherein aspects of the present disclosure can be implemented.

Referring now to FIG. 2 and FIG. 3, they generally illustrate example environments wherein aspects of the present disclosure can be implemented. One skilled in the art can appreciate that the example elements depicted by FIG. 2 and FIG. 3 are illustrated to provide an operational framework for describing the present disclosure. Accordingly, in some embodiments the physical layout of each environment may be different depending on different implementation schemes. Thus the example operational framework is to be treated as illustrative only and in no way limit the scope of the claims. One skilled in the art can also appreciate that the following discussion is introductory and the elements depicted by FIG. 2 and FIG. 3 are described in more detail within the discussion of the operational procedures depicted by FIG. 4 through FIG. 16.

Generally, FIG. 2 depicts a high level overview of a server environment that can be configured to include aspects of the present disclosure. In reference to the figure, depicted is a server 204 that can include circuitry configured to effectuate a terminal server, or in other embodiments the server 204 can include circuitry configured to support remote desktop connections. In the depicted example, the server 204 can be configured to generate one or more sessions for connecting clients such as sessions 1 through N (where N is an integer greater than 2). Briefly, a session in example embodiments of the present disclosure can generally include an operational environment that is effectuated by a plurality of subsystems, e.g., software code, that are configured to interact with a kernel 214 of server 204. For example, a session can include a process that instantiates a user interface such as a desktop window, the subsystems that track mouse movement within the window, the subsystems that translate a mouse click on an icon into commands that effectuate an instance of a program, etc. A session can be generated by the server 204 on a user by user basis by the server 204 when, for example, the server 204 receives a connection request over a network connection from a client 201. Generally, a connection request can first be handled by the transport logic 210 that can, for example, be effectuated by circuitry of the server 204. The transport logic 210 can in some embodiments include a network adaptor; firmware, and software that can be configured to receive connection messages and forward them to the engine 212. As illustrated by FIG. 2, the transport logic 210 can in some embodiments include protocol stack instances for each session. Generally, each protocol stack instance can be configured to route user interface output to a client and route user input received from the client to the session core 244 associated with its session.

Continuing with the general description of FIG. 2, the engine 212 in some example embodiments of the present disclosure can be configured to process requests for sessions; determine the functionality for each session; generate sessions by allocating a set of physical resources for the session; and instantiating a protocol stack instance for the session. In some embodiments the engine 212 can be effectuated by specialized circuitry components that can implement some of the above mentioned operational procedures. For example, the circuitry in some example embodiments can include memory and a processor that is configured to execute code that effectuates the engine 212. As depicted by FIG. 2, in some instances the engine 212 can receive connection requests and determine that, for example, a license is available and a session can be generated for the request. In the situation where the server 204 is a remote computer that includes remote desktop capabilities, the engine 212 can be configured to generate a session in response to a connection request without checking for a license. As illustrated by FIG. 2, a session manager 216 can be configured to receive a message from an engine 212 and in response to the message the session manager 216 can add a session identifier to a table; assign memory to the session identifier; and generate system environment variables and instances of subsystem processes in memory assigned to the session identifier.

As illustrated by FIG. 2, the session manager 216 can instantiate environment subsystems such as a runtime subsystem 240 that can include a kernel mode part such as the session core 244. For example, the environment subsystems in an embodiment are configured to expose some subset of services to application programs and provide an access point to the kernel of the operating system 214. In example embodiments the runtime subsystem 240 can control the execution of processes and threads and the session core 244 can send requests to the executive of the kernel 214 to allocate memory for the threads and schedule time for them to be executed. In an embodiment the session core 244 can include a graphics display interface 246 (GDI), a security subsystem 250, and an input subsystem 252. The input subsystem 252 can in these embodiments be configured to receive user input from a client 201 via the protocol stack instance associated with the session and transmit the input to the session core 244 for the appropriate session. The user input can in some embodiments include signals indicative of absolute and/or relative mouse movement commands, mouse coordinates, mouse clicks, keyboard signals, joystick movement signals, etc. User input, for example, a mouse double-click on an icon, can be received by the session core 244 and the input subsystem 252 can be configured to determine that an icon is located at the coordinates associated with the double-click. The input subsystem 252 can then be configured to send a notification to the runtime subsystem 240 that can execute a process for the application associated with the icon.

In addition to receiving input from a client 201, draw commands can be received from applications and/or a desktop and be processed by the GDI 246. The GDI 246 in general can include a process that can generate graphical object draw commands. The GDI 246 in this example embodiment can be configured to pass its output to the remote display subsystem 254 where the commands are formatted for the display driver that is attached to the session. In certain example embodiments one or more physical displays can be attached to the server 204, e.g., in a remote desktop situation. In these example embodiments the remote display subsystem 254 can be configured to mirror the draw commands that are rendered by the display driver(s) of the remote computer system and transmit the mirrored information to the client 201 via a stack instance associated with the session. In another example embodiment, where the server 204 is a terminal server, the remote display subsystem 254 can be configured to include virtual display driver(s) that may not be associated with displays physically attached to the server 204, e.g., the server 204 could be running headless. The remote display subsystem 254 in this embodiment can be configured to receive draw commands for one or more virtual displays and transmit them to the client 201 via a stack instance associated with the session. In an embodiment of the present disclosure, the remote display subsystem 254 can be configured to determine the display resolution for each display driver, e.g., determine the display resolution of the virtual display driver(s) associated with virtual displays or the display resolution of the display drivers associated with physical displays; and route the packets to the client 201 via the associated protocol stack instance.

In some example embodiments the session manager 216 can additionally instantiate an instance of a logon process associated with the session identifier of the session that can be configured to handle logon and logoff for the session. In these example embodiments drawing commands indicative of the graphical user interface associated with the logon process can be transmitted to the client 201 where a user of the client 201 can input an account identifier, e.g., a username/password combination, a smart card identifier, and/or biometric information into a logon screen. The information can be transmitted to server 204 and routed to the engine 212 and the security subsystem 250 of the session core 244. For example, in certain example embodiments the engine 212 can be configured to determine whether the user account is associated with a license; and the security subsystem 250 can be configured to generate a security token for the session.

Referring now to FIG. 3, it depicts an example client 201 wherein aspects of the present disclosure can be implemented. Generally, FIG. 3 example client 201 can be operatively coupled to a server 204 via the Internet. In an embodiment the client 201 can be a computer a terminal effectuated by hardware configured to direct user input to the server 204 and display user interface information generated by the server 204. In another embodiment, client 201 can be a computer that includes similar elements as those of personal computer 20 of FIG. 1. In this example embodiment, client 201 can include circuitry configured to effect an operating system 312 and circuitry configured to emulate the functionality of a terminal. One skilled in the art can appreciate that the circuitry configured to effectuate the operating system 312 can also be configured to emulate a terminal. Continuing with the general description of FIG. 3, the client 201 can include a client subsystem 306 that can in some embodiments expose a subset of executive services, and DLLs that translate API calls into kernel mode calls for the kernel 314. In an embodiment the client subsystem 306 can include a display driver for a display that can be coupled to the client 201. The client subsystem 306 can be configured to receive draw commands from the server 204 and direct the display driver to draw the images to the virtual desktop 302. Once the virtual desktop 302 is drawn in memory, the display driver can be configured to render a view of the virtual desktop 302 on a physical display, e.g., the client subsystem 306 can direct the display driver to take a view 304 of the virtual desktop 302 and render it on a display. Continuing with the general description of FIG. 3, depicted is a scrolling subsystem 308 that can in some embodiments be a portion of the client subsystem 306 or a separate subsystem that interact with the client subsystem 306. The scrolling subsystem 308 generally can be configured to determine when to scroll the view 304 of the virtual desktop 302 by tracking different variables.

The following are a series of flowcharts depicting implementations of processes. For ease of understanding, the flowcharts are organized such that the initial flowcharts present implementations via an overall "big picture" viewpoint. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various operational procedures.

Figure 4:
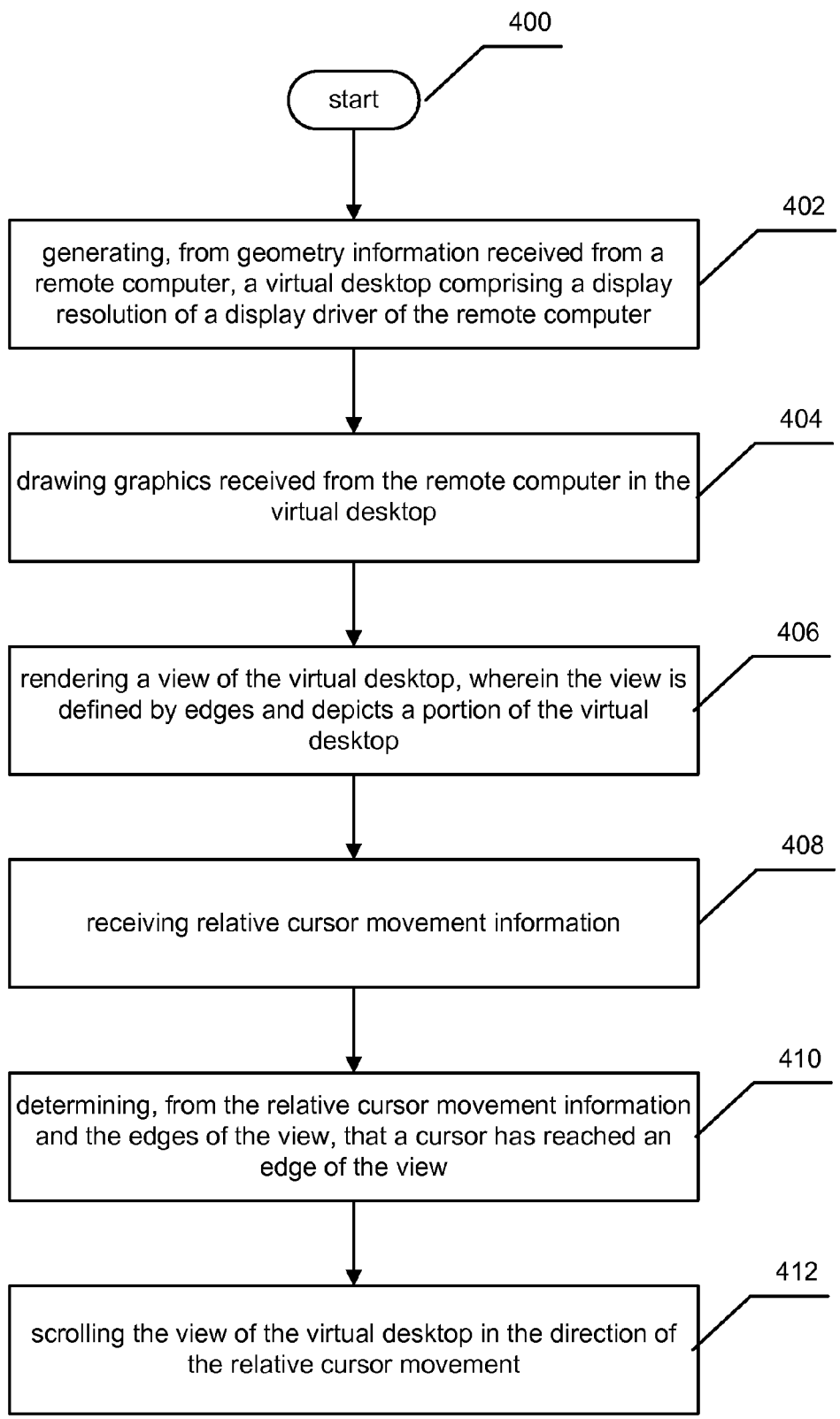
FIG. 4 depicts an example flowchart for practicing aspects of the present disclosure.

Referring now to FIG. 4, depicted is an example flowchart for practicing aspects of the present disclosure including operations 400 though 412. Example operation 400 begins the operational procedure and operation 402 depicts generating, from geometry information received from a remote computer, a virtual desktop comprising a display resolution of a display driver of the remote computer. For example, and referring to FIG. 2 in conjunction with FIG. 3, a client 201 can be configured to receive a signal, e.g., one or more packets of information indicative of geometry information from a server 204 and a client subsystem 306 of FIG. 3 can be configured to process the information in order to generate a virtual desktop 302 in memory. In an example embodiment the geometry information can define a display resolution of a display driver of the server 204 and client subsystem 306 can generate a virtual desktop 302, e.g., a bitmap that has the same display resolution as the server 204.

In an embodiment of the present disclosure the remote display subsystem 254 of the server 204 can be configured to generate geometry information by, for example, generating a bounding box that includes an amount of pixels equal to the amount of display pixels associated with the display driver(s) of the server 204. In a specific example, four display drivers could be instantiated by server 204 and each may have a resolution of 1280 by 1024 pixels. In this example the remote display subsystem 254 could generate a bounding box that has a geometry of 5120 by 1024 pixels. The remote display subsystem 254 can additionally be configured to translate the position of icons and the like from coordinates specific to each display driver to coordinates of the bounding box and send the geometry to the client 201 via the transport logic 210. In this example the client 201 can be configured to generate a bounding box from the geometry. Continuing the specific example, the client subsystem 306 can be configured to receive the signal and direct the display driver to generate a virtual desktop 302 with a size of 5120 by 1024 pixels in memory. In this example the client subsystem 306 can then configure a display driver to draw graphics in the bitmap relative to their location in the bounding box. In another specific example, the remote display subsystem 254 can be configured to determine that a display driver attached to the server 204 is configured to output a display resolution of 2048 by 1536 pixels. In this example, the remote display subsystem 254 could be configured to transmit geometry information indicative of the display resolution to the client 201 via the transport logic 210. In this specific example, the client subsystem 306 can be configured to receive the signal and generate a virtual desktop 302 with a size of 2048 by 1536 pixels in memory and the client subsystem 306 can configure a display driver to draw graphics in the bitmap relative to their location in the bounding box.

Continuing with the description of FIG. 4, operation 404 depicts drawing graphics received from the remote computer in the virtual desktop. For example, and continuing with the previous example, the client subsystem 306 can be configured to receive a signal, e.g., one or more packets indicative of drawing commands from the remote display subsystem 254. The commands can be processed by the client subsystem 306 and the display driver of the client 201 can be configured to draw images in the virtual desktop 302. In a specific example, a signal can be received from the server 204 that defines a desktop environment with a plurality of icons along with positional information for each icon relative to the server 204. The client subsystem 306 can process the information and direct the display driver to draw the desktop and the icons relative to the bounding box.

Continuing with the description of FIG. 4, operation 406 depicts rendering a view of the virtual desktop, wherein the view is defined by edges and depicts a portion of the virtual desktop. Continuing with the description of the example operational procedure, after the graphics are received from the server 204 and drawn to the virtual desktop 302, a display driver of the client subsystem 306 can be configured to render a view 304 of the virtual desktop 302. For example, in an embodiment of the present disclosure while the entire virtual desktop 302 can be drawn to memory, the display driver may only render a subset of the graphics on a display attached to the client 201 based on whether the subset is located in a current view of the virtual desktop 302. In an embodiment of the present disclosure the display driver of the client 201 may have a specific display resolution that is less than the display resolution of the virtual desktop 302, e.g., the size of the virtual desktop 302 may be 2048 by 1536 pixels whereas the display driver of the client 201 may only be able to render a display resolution of 800 by 600 pixels. In this example the client subsystem 306 can be configured receive information that defines the display resolution of the view 304; the coordinates of the view relative to the virtual desktop 302; and configure the display driver to render the images depicted within the dimensions of the view 304.

Continuing with the description of FIG. 4, operation 408 depicts receiving relative cursor movement information. For example, and in addition to the previous example the scrolling subsystem 308 can be configured to receive relative mouse movement information from an operating system 312 of the client 201. For example, in an embodiment the operating system 312 can be configured to track the movement of a cursor 310, e.g., a bitmap, in the view 304. The cursor 310 in some embodiments can contain a single-pixel point called a hotspot, e.g., a point that the operating system 312 tracks and recognizes as the position of the cursor 310. In this example embodiment, the scrolling subsystem 308 can be configured to receive, for example, input messages at predetermined instances that identify the direction that a physical input device, e.g., a touchpad or a mouse, was moved. For example, in an embodiment the operating system 312 of the client 201 can be configured to track each time an input device, e.g., a mouse or touchpad is physically moved. The input messages in this example can include information such as (+1,+1) in the event that the input device was moved up and to the right. In an alternative embodiment the scrolling subsystem can 308 can be configured to track absolute cursor movement information that identifies the coordinates of the cursor 310 relative to the virtual desktop 302. In this example the scrolling subsystem 308 can be configured to calculate the from the position information.

Continuing with the description of FIG. 4, operation 410 depicts determining, from the relative cursor movement information and the edges of the view, that a cursor has reached an edge of the view. For example, in an embodiment of the present disclosure the scrolling subsystem 308 can be configured to receive information that identifies pixel ranges of the view 304 relative to the virtual desktop 302, and the current location of the cursor 310. The scrolling subsystem 308 can additionally be configured to receive messages that can, for example, include absolute mouse movement information and/or relative mouse movement information. The scrolling subsystem 308 can the determine whether the cursor 310 has reached an edge of the view 304 by determining the position of the cursor 310 relative to the virtual desktop 302 and comparing the position to pixel ranges that define the view 304 relative to the virtual desktop 302, e.g., by comparing the x and y coordinates of the cursor 310 relative to the virtual desktop 302 to the x and y coordinates that defines the edges of the view 304 relative to the virtual desktop 302 each time a mouse movement message is received. In a specific example the scrolling subsystem 308 can include a table that includes the coordinates of the cursor 310 in the virtual desktop, e.g., pixel 400 by 300 and the pixels that define the view of the virtual desktop, e.g., pixels 0 to 800 on the x-axis and 0 to 600 on the y-axis. As the user moves a mouse the cursor 310 can move from, for example, left to right across the view 304. The scrolling subsystem 308 can increment the pixel position of the cursor 310 and for each increment check to see whether the pixel has reached an edge, e.g., x-axis pixels 800 in this example. In the instance that the scrolling subsystem 308 determines that the x-axis edge is reached, e.g., the cursor 310 is located at pixel point 800 by 300, the scrolling subsystem 308 can be configured to send a message to the client subsystem 306.

Continuing with the description of FIG. 4, operation 412 depicts scrolling the view of the virtual desktop in the direction of the relative cursor movement. For example, and in addition to the previous example in the instance that the scrolling subsystem 308 determines that an edge of the view 304 has been reached, the scrolling subsystem 308 can be configured to send a signal to the client subsystem 306 to pan the view 304 in the direction of the relative mouse movement. For example, in a specific embodiment the scrolling subsystem 308 may receive a signal that indicates that the mouse moved +1 in the x-direction when the cursor 310 was located on the right edge of the view 304. The scrolling subsystem 308 can be configured to send a message to the client subsystem 306 to pan the view +1 pixels on the x-axis. In this example the cursor 310 can may move another +1 pixels in the x-direction and the scrolling subsystem 308 can determine that the cursor 310 is on the new edge. Thus, if mouse is moved again to the right the scrolling subsystem 308 can be configured to send a signal to the client subsystem 306 to pan the view 304 again.

Figure 5:
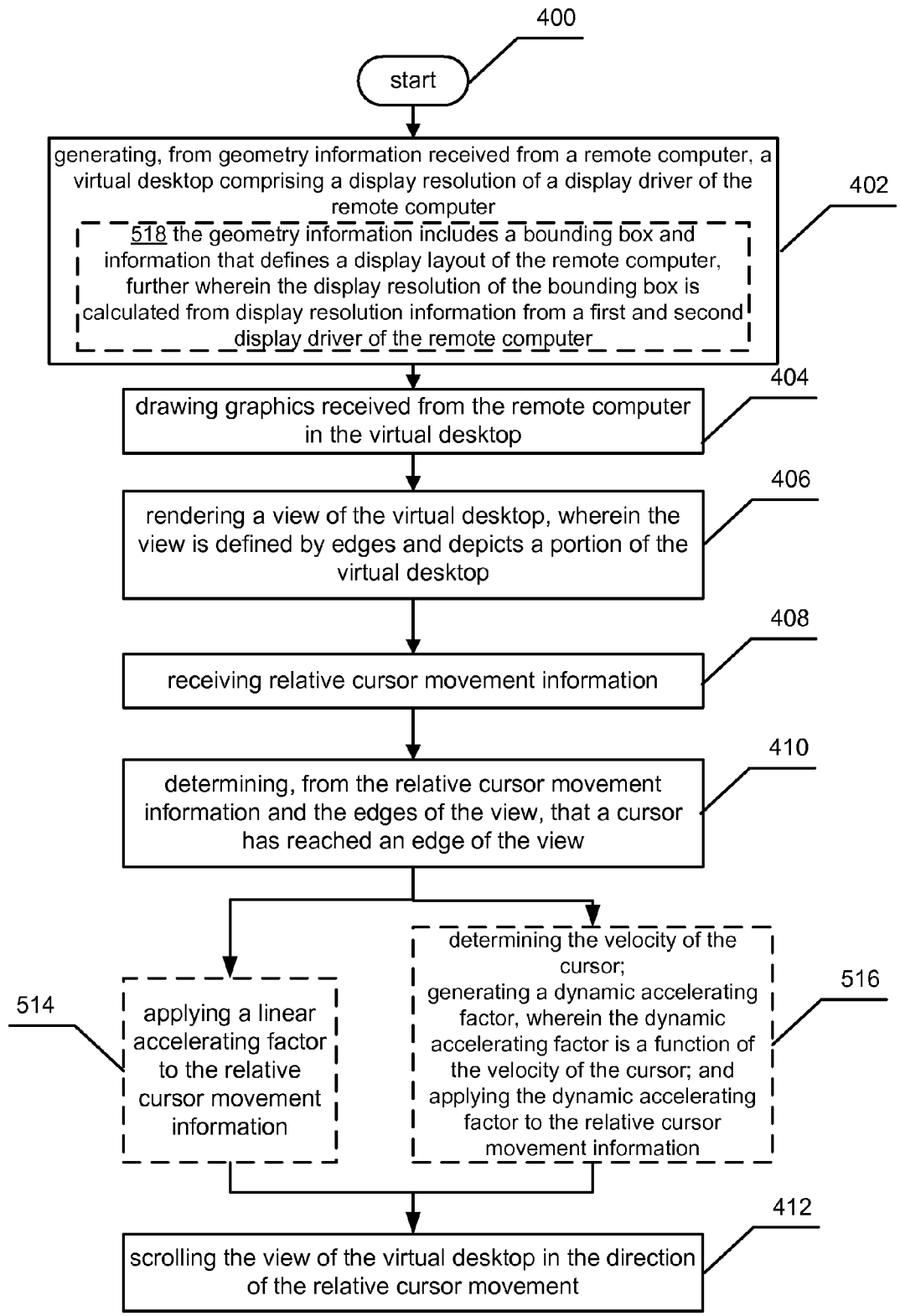
FIG. 5 depicts alternative embodiments of the operational procedure 400 of FIG. 4.
Figure 6:
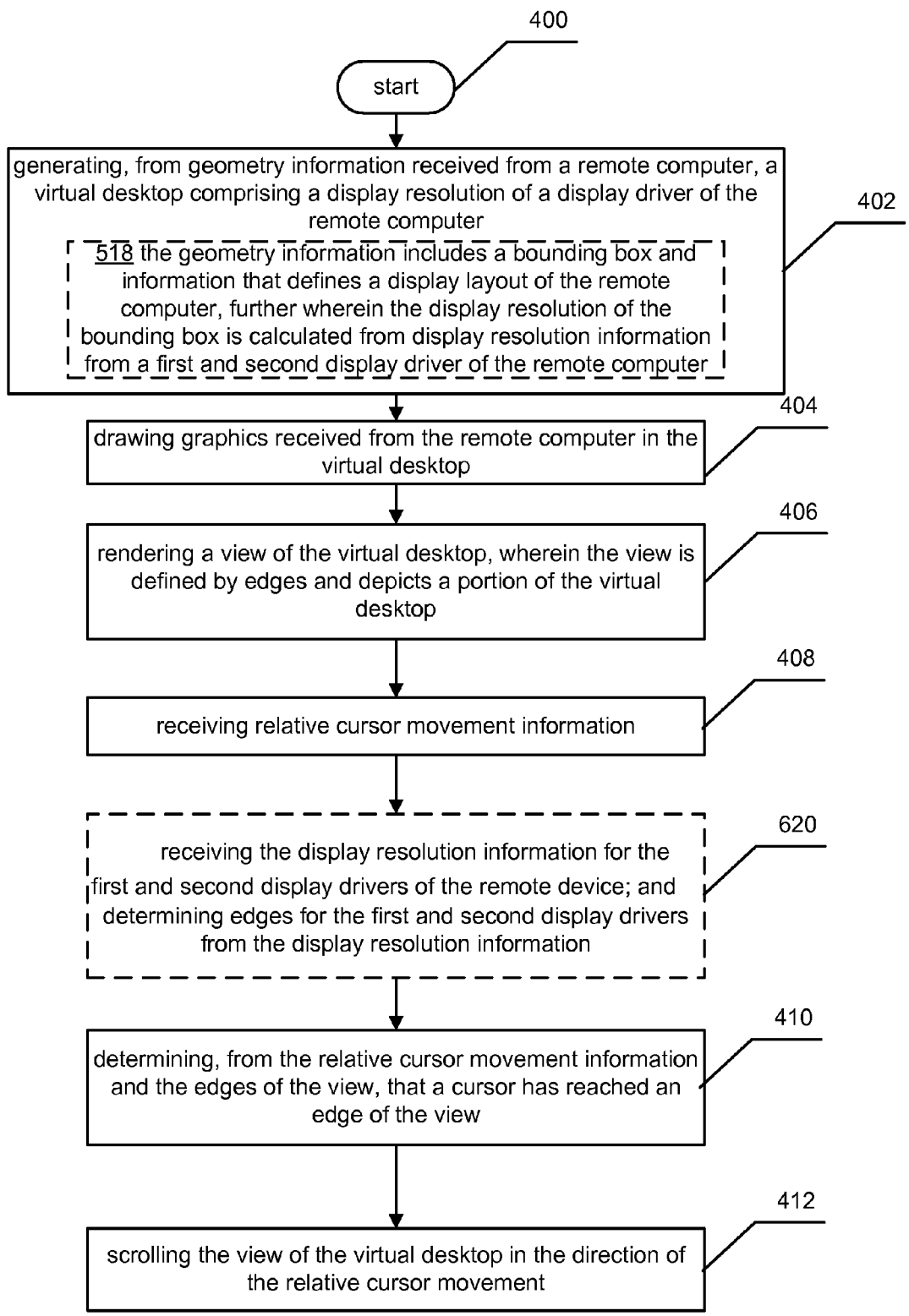
FIG. 6 illustrates an alternative embodiment of the operational procedure 400 of FIG. 5.
Figure 7:
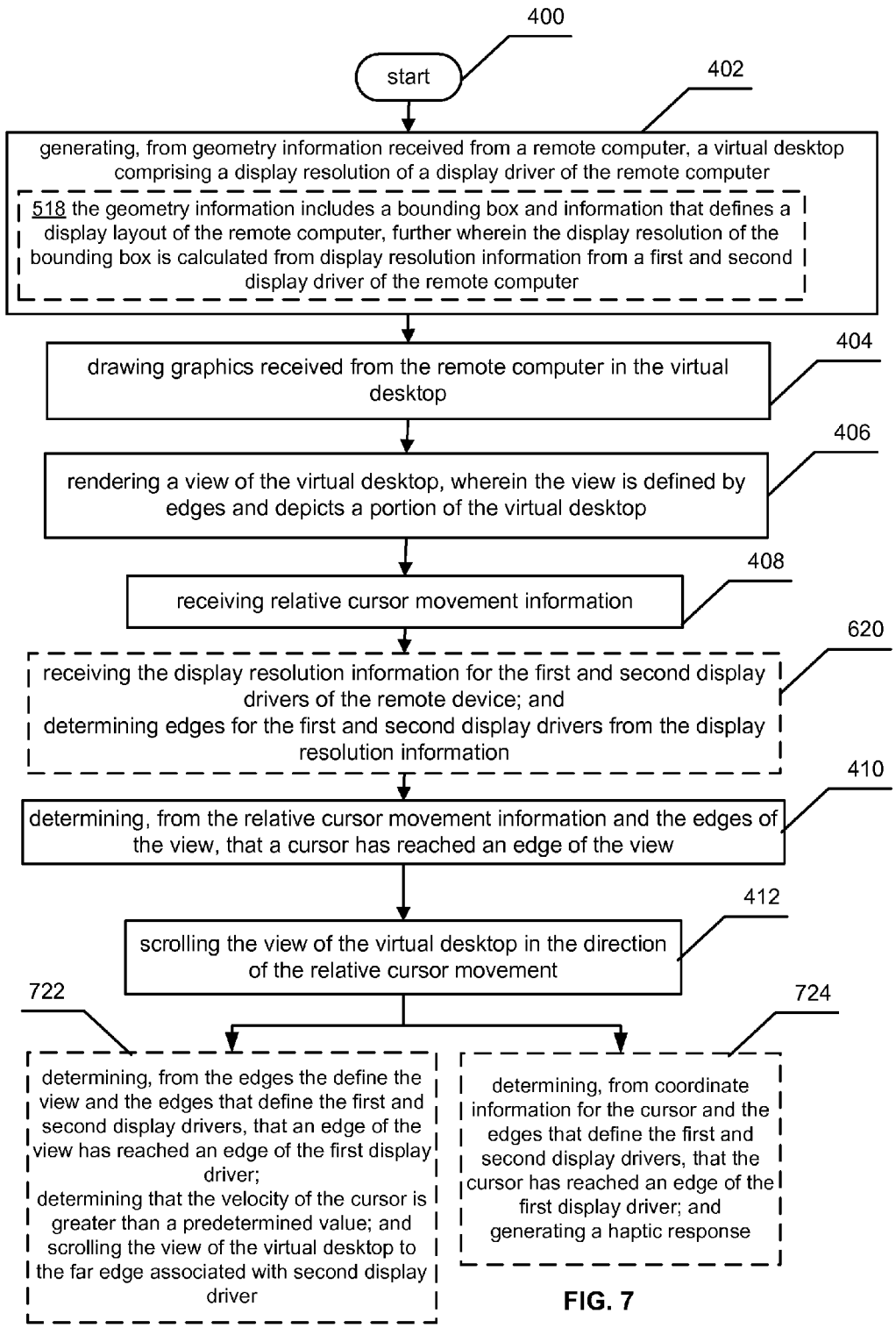
FIG. 7 illustrates an alternative embodiment of the operational procedure 400 of FIG. 6.

Referring now to FIG. 5-7, they depict alternative embodiments of the operational procedure 400 of FIG. 4. FIG. 5 depicts an alternative embodiment of FIG. 4 including additional operational procedures 514 and 516 and a refinement 518 to the operational procedure 400 of FIG. 4. In reference to operation 514, it illustrates applying a linear accelerating factor to the relative cursor movement information. For example, in an embodiment of the present disclosure the scrolling subsystem 308 can be configured to receive relative cursor movement information; multiply the relative cursor movement information by a scaling value; and transmit a signal to the client subsystem 306 to scroll the view 304 the amount defined by the scaled value. For example, in example embodiment in may be desirable to pan the view 304 a greater number of pixels than an amount equal to the relative mouse movement, e.g., in example embodiments where the client 201 includes a touchpad the user may have to scroll their finger across the touchpad an unreasonable amount of times to move the view 304 from one side of a virtual desktop 302 to another. Thus, in an embodiment the scrolling subsystem 308 can be configured to multiply the relative movement information by a fixed value and direct the client subsystem 306 to move the view 304 the scaled amount. In a specific example the scrolling subsystem 308 can be configured to determine that the cursor position is on a pixel that defines the right edge of the view 304. In this example if the user moves the mouse +1 in the x-direction the scrolling subsystem 308 can multiply the pixel movement by a fixed number such as 50 and send a message to the client subsystem 306 to move pan the view 304 +50 pixels in the x-direction.

Continuing with the description of FIG. 5, it additionally depicts operation 516 that illustrates determining the velocity of the cursor; generating a dynamic accelerating factor, wherein the dynamic accelerating factor is a function of the velocity of the cursor; and applying the dynamic accelerating factor to the relative cursor movement information. For example, in an embodiment of the present disclosure the scrolling subsystem 308 can be configured to receive relative cursor movement information; multiply it by a dynamic scaling value; and transmit a signal to the client subsystem 306 to scroll the view 304 in amount defined by the scaled value. For example, in an embodiment in may be desirable to pan the view 304 a large number of pixels in the instance that the cursor 310 is moved across the view 304 quickly. For example, if a user moves a cursor 310 across a view 304 it can be inferred that the user is interested in manipulating something at the far end of the virtual desktop 302. In this example, the scrolling subsystem 308 can be configured to infer that the user's intent is to pan the view 304 a large amount of pixels. In this situations the scrolling subsystem 308 can be configured to generate a scaling value that is dependent on the velocity of the cursor 310 as it moves across the view 304. For example, the scrolling subsystem 308 can be configured to track the coordinates of the cursor 310 over the last 64 samples. The sampling rate may be constant and the scrolling subsystem 308 can be configured to determine the average velocity of the cursor 310. In this example the scrolling subsystem 308 can be configured to increase the scaling value based on the average velocity of the cursor 310 and direct the client subsystem 306 to pan the view 304 the scaled amount. In a specific example the scaling value can exponentially increase with velocity. Thus, the faster that the cursor 310 moves in the view 304 the more of the view 304 will be scrolled by the client subsystem 306. In a specific embodiment, the cursor 310 may move from left to right across the view 304. In this specific example the scrolling subsystem 308 may receive a number of messages that indicate that the coordinates of the cursor 310 are changing in the x-direction at +10 a sample. In this specific example, the scrolling subsystem 308 could be configured to determine a dynamic accelerating factor by taking $e^{10}$ and direct the client subsystem 306 to move the view 304 22,026 pixels in the x-direction. In the same or other embodiments the scrolling subsystem 308 can be configured to set a maximum dynamic value such as 403, thus in this situation the client subsystem 306 may not massively change the view 304 by scrolling thousands of pixels.

In an alternative embodiment the scrolling subsystem 308 can be configured to determine the velocity of the cursor 310 and change the pixel range that the scrolling subsystem 308 considers as the edges of the view 304. In this example the scrolling subsystem 308 can detect the velocity of the cursor 310 and generate a bounding box that acts as the edges inside the view 304 that shrinks as cursor velocity increases. For example, in a view 304 that includes 800 by 600 pixels the edges of the view 304 can be pixels 0 and 800 in the x-direction and 0 to 600 in the y-direction. If the velocity of the cursor 310 is detected as +1 the edges the scrolling subsystem 308 can keep the edges the same. If however, the velocity is detected at +10 in the x-direction, the scrolling subsystem 308 can configure the edges to be pixels 0 and 720 in the x-direction and 0 to 540 in the y-direction. While the size of the view 304 in this example remains 800 by 600, the scrolling operation can be configured to occur before the physical edge of the view 304 is reached. In this example if the cursor 310 moves quickly, the client subsystem 306 can configure the display driver to pan the view prior to the cursor 310 reaching the physical edge of the view 304. This alternative implementation can be used in conjunction with other accelerating techniques to configure the client subsystem 306 to pan the view 304 faster.

Continuing with the description of FIG. 5, it additionally depicts a refinement of operation 402. Refinement 518 illustrates generating, from geometry information received from a remote computer, a virtual desktop, wherein the geometry information includes a bounding box and information that defines a display layout of the remote computer, further wherein the display resolution of the bounding box is calculated from display resolution information from a first and second display driver of the remote computer. For example, in an embodiment of the present disclosure the remote display subsystem 254 of server 204 can be configured to generate a bounding box that defines a pixel range equal to the sum of the pixel ranges associated with a first display driver and a second display driver. In these example embodiments the remote display subsystem 254 can be configured to remap the coordinates of, for example, a second display driver to the bounding box, e.g., pixel (0,0) on a second display that has a pixel range of 800 by 600 can be remapped to pixel (1280,0) in the instance where the first display driver has a display resolution of 1280 by 1024. The remote display subsystem 254 in this example can be configured to generate a bounding box that includes a sum of the pixels of each display driver according to the logical layout of the display drivers on the server 204. For example, if the first display driver is configured to render an image logically to the left of the second, the bounding box generated by the remote display subsystem 254 can have a resolution of 2080 by 1024 pixels. In another example, if the first display driver is configured to render an image logically above the second, the bounding box generated by the remote display subsystem 254 can have dimensions of as 1280 by 1624 pixels. In these situations, the remote display subsystem 254 can be configured to transmit a signal indicative of the dimensions to the client 201 via the transport logic 210. In this example the client subsystem 306 can be configured to generate a virtual desktop 302 that includes the pixel range of the bounding box. In addition to transmitting the pixel range of the bounding box, the remote display subsystem 254 can additionally be configured to transmit the layout of the display drivers of the server 204. For example, if a display driver that has a display resolution of 1280 by 1024 is located logically to the left of the second display driver that has a pixel range of 800 by 600, the pixels the virtual desktop can be configured to include the same layout, e.g., the pixels of the second display driver can be remapped to start at pixel (1280, 0) of the bounding box. If on the other hand if the display driver that has a display resolution of 1280 by 1024 is located logically to the right of the second display driver that has a pixel range of 800 by 600 the pixels of the first display driver can be remapped to start at pixel (800,0) of the bounding box.

Referring to FIG. 6, it illustrates an alternative embodiment of the operational procedure 400 of FIG. 5 including the additional operation 620. Regarding operation 620, it illustrates receiving the display resolution information for the first and second display drivers of the remote device; and determining edges for the first and second display drivers from the display resolution information. For example, in an embodiment of the present disclosure the remote display subsystem 254 of server 204 can be configured to generate a bounding box that includes a pixel range that is equal to the sum of the pixel ranges associated with a first display driver and a second display driver. In addition to transmitting the bounding box to the client 201, the remote display subsystem 254 can be configured to transmit a signal indicative of the geometry for each display driver to the client 201 via the transport logic 210. In this example embodiment the client subsystem 306 can be configured to receive the one or more packets indicative of the geometry for each display driver and determine the pixel locations in the virtual desktop 302 associated with the edges of display drivers. In this example embodiment, the client subsystem 306 can be configured to communicate this information to the scrolling subsystem 308.

Referring to FIG. 7, it illustrates an alternative embodiment of the operational procedure 400 of FIG. 6 including the additional operation 722 and 724. Regarding operation 722, it illustrates the sub-operations determining, from the edges the define the view and the edges that define the first and second display drivers, that an edge of the view has reached an edge of the first display driver; determining that the velocity of the cursor is greater than a predetermined value; and scrolling the view of the virtual desktop to the far edge associated with second display driver. For example, and in addition to the previous example in an embodiment of the present disclosure the scrolling subsystem 308 can be configured to pan the view 304 to a far edge that is associated with pixels of a second display. In an example implementation, the scrolling subsystem 308 can be configured to perform this jump operation when an edge of the view 304 reaches an edge associated with a first display and the cursor 310 is moving at a predetermined velocity. For example, the scrolling subsystem 308 in this example embodiment can be configured to receive information that identifies the edges of the view 304 relative to the virtual desktop 302, the pixel values relative to the virtual desktop 302 that define the edges of the display drivers of the server 204, and the velocity of the cursor 310. In this example embodiment, the scrolling subsystem 308 can be configured to detect when an edge of the view 304 meets the edge of a remote display driver. If the scrolling subsystem 308 determines that the edge is reached, e.g., that the edge of the view 304 is on pixel 1280 and a first example display driver's resolution ends at pixel 1280, the scrolling subsystem 308 can be configured to determine the velocity of the cursor 310. If the velocity of the cursor 310 is greater than a predetermined threshold, e.g., +15 pixels per sample, the scrolling subsystem 308 can be configured to determine that the user wants to jump an entire screen and send a signal to the client subsystem 306 to move the view 304 to the far edge associated with the remote display driver of the server 204, e.g., pixel 1624 of the virtual desktop 302. In an embodiment this operation may be desirable when the user has maximized window sizes of applications in pixel ranges associated with different displays. If a user wants to jump back and forth between displays they can move their mouse at a certain speed and the scrolling subsystem 308 can 'bump' the view 304 of the virtual desktop over an entire display.

In an alternative embodiment, instead of jumping to the far edge of the virtual desktop 302 the view 304 can be configured to jump a range of pixels equal to the display resolution of the view 304. For example, the scrolling subsystem 308 in this example embodiment can be configured to receive information that identifies the edges of the view 304 relative to the virtual desktop 302 and the velocity of the cursor 310. In this example embodiment, the scrolling subsystem 308 can be configured to detect when the cursor 310 reaches a specific edge of the view 304. If the scrolling subsystem 308 determines that a specific edge is reached and the velocity of the cursor 310 is greater than a predetermined threshold, e.g., +15 pixels per sample, the scrolling subsystem 308 can be configured to determine that the user wants to jump the view 304 and send a signal to the client subsystem 306 to move the right edge of the view 800 pixels to the right.

Continuing with the description of FIG. 7, operation 724 depicts determining, from coordinate information for the cursor and the edges that define the first and second display drivers, that the cursor has reached an edge of the first display driver; and generating a haptic response. For example, and in addition to the previous example in an embodiment of the present disclosure the scrolling subsystem 308 can be configured generate a haptic response, e.g., a signal that when processed by a component of either the client 201 or a peripheral, generates a vibration. For example, a mouse, or touchpad can be configured to include a motor that rotates a mass in response to an electrical signal received from the scrolling subsystem 308. In this example, the act of rotating the mass causes the housing of the mouse, or laptop to rumble. In this example the scrolling subsystem 308 can be configured to receive information that identifies the position of the view 304, e.g., the pixel values relative to the virtual desktop 302 that define the position of the cursor 310, and the pixel values relative to the virtual desktop 302 that define the edges of the display drivers of the server 204. In this example embodiment, the scrolling subsystem 308 can be configured to detect when the position of the cursor 310 meets the edge of a remote display driver. If the scrolling subsystem 308 determines that the edge is reached, e.g., that the position of the cursor 310 is on pixel 1280 in the embodiment where the two display drivers are 1280 by 1024 and 800 by 600, the scrolling subsystem 308 can be configured to send a signal to a user input device such as a mouse that directs a haptic subsystem to shake a user input device.

Figure 8:
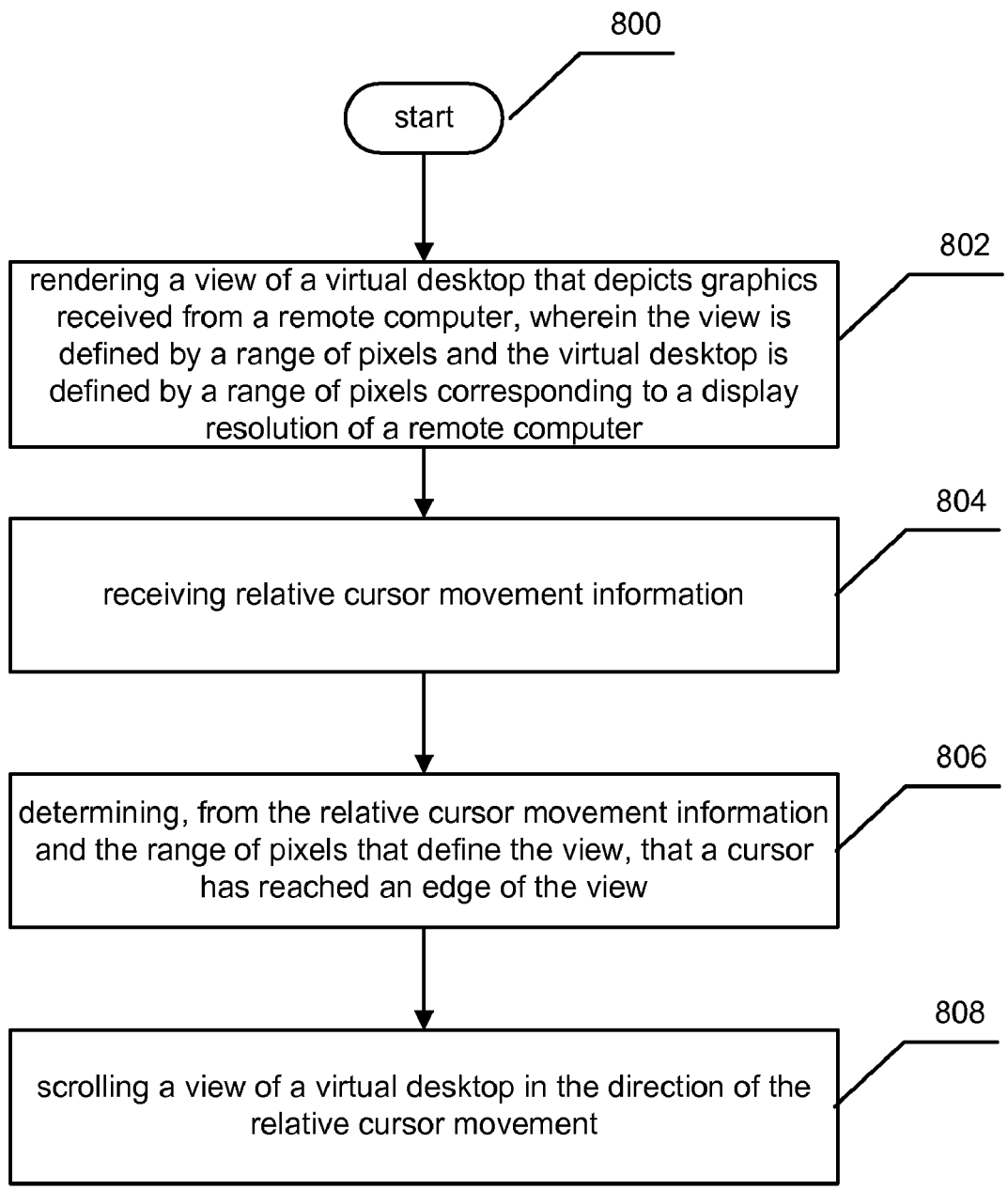
FIG. 8 depicts is an example flowchart for practicing aspects of the present disclosure.

Referring now to FIG. 8, depicted is an example flowchart for practicing aspects of the present disclosure including operations 800 though 808. In an embodiment of the present disclosure the example operational procedures of FIG. 8 can be embodied in computer readable instructions stored on a computer readable storage medium. The computer readable instructions can be processed by a processor of client 201 and the processor can perform the operational procedures. Referring now to FIG. 8, example operation 800 begins the operational procedure and operation 802 depicts rendering a view of a virtual desktop that depicts graphics received from a remote computer, wherein the view is defined by a range of pixels and the virtual desktop is defined by a range of pixels corresponding to a display resolution of a remote computer. For example, a client subsystem 306 can be configured to direct a display driver to generate a virtual desktop 302 in memory of the client 201 and draw graphics received from the server 204 on the virtual desktop 302. In this example embodiment, the display driver of the client 201 can be configured to render a view 304 of the virtual desktop 302 that is defined by a pixel range, e.g., 800 by 600. For example, in an embodiment of the present disclosure while the entire virtual desktop 302 is drawn to memory by the display driver, the display driver may only render a subset of the graphics on a display attached to the client 201 based on whether the subset is located in a current view of the virtual desktop 302. In an embodiment the display driver of the client 201 may have a specific display resolution that is less than the display resolution of the virtual desktop 302, e.g., the size of the virtual desktop 302 may be 2048 by 1536 pixels whereas the display driver of the client 201 may only be able to render a display resolution of 800 by 600 pixels. In this example the client subsystem 306 can be configured receive information that defines the display resolution of the view 304; the coordinates of the view relative to the virtual desktop 302; and configure the display driver to render the images depicted within the dimensions of the view 304.

Continuing with the description of FIG. 8, it additionally depicts operation 804 that illustrates receiving relative cursor movement information. For example, and in addition to the previous example the scrolling subsystem 308 can be configured to receive relative mouse movement information from an operating system 312 of the client 201. For example, in an embodiment the operating system 312 can be configured to track the movement of a cursor 310, e.g., a bitmap, in the view 304. The cursor 310 in some embodiments can contain a single-pixel point called a hotspot, e.g., a point that the operating system 312 tracks and recognizes as the position of the cursor 310. In this example embodiment, the scrolling subsystem 308 can be configured to receive, for example, input messages at predetermined instances that identify the direction that a physical input device, e.g., a touchpad or a mouse, was moved. For example, in an embodiment the operating system 312 of the client 201 can be configured to track each time an input device, e.g., a mouse or touchpad is physically moved. The input messages in this example can include information such as (+1,+1) in the event that the input device was moved up and to the right. In an alternative embodiment the scrolling subsystem can 308 can be configured to track absolute cursor movement information that identifies the coordinates of the cursor 310 and calculate movement of the cursor relative to the virtual desktop 302.

Continuing with the description of FIG. 8, it additionally depicts operation 806 that illustrates determining, from the relative cursor movement information and the range of pixels that define the view, that a cursor has reached an edge of the view. For example, in an embodiment of the present disclosure the scrolling subsystem 308 can be configured to receive information that identifies pixel ranges of the view 304 relative to the virtual desktop 302, and the current location of the cursor 310. The scrolling subsystem 308 can additionally be configured to receive messages that can, for example, include absolute mouse movement information and/or relative mouse movement information. The scrolling subsystem 308 can the determine whether the cursor 310 has reached an edge of the view 304 by determining the position of the cursor 310 relative to the virtual desktop 302 and comparing the position to pixel ranges that define the view 304 relative to the virtual desktop 302, e.g., by comparing the x and y coordinates of the cursor 310 relative to the virtual desktop 302 to the x and y coordinates that defines the edges of the view 304 relative to the virtual desktop 302 each time a mouse movement message is received. In a specific example the scrolling subsystem 308 can include a table that includes the coordinates of the cursor 310 in the virtual desktop, e.g., pixel 400 by 300 and the pixels that define the view of the virtual desktop, e.g., pixels 0 to 800 on the x-axis and 0 to 600 on the y-axis. As the user moves a mouse the cursor 310 can move from, for example, left to right across the view 304. The scrolling subsystem 308 can increment the pixel position of the cursor 310 and for each increment check to see whether the pixel has reached an edge, e.g., x-axis pixels 800 in this example. In the instance that the scrolling subsystem 308 determines that the x-axis edge is reached, e.g., the cursor 310 is located at pixel point 800 by 300, the scrolling subsystem 308 can be configured to send a message to the client subsystem 306.

Continuing with the description of FIG. 8, it additionally depicts operation 808 that illustrates scrolling a view of a virtual desktop in the direction of the relative cursor movement. For example, and in addition to the previous example in the instance that the scrolling subsystem 308 determines that an edge of the view 304 has been reached, the scrolling subsystem 308 can be configured to send a signal to the client subsystem 306 to pan the view 304 in the direction of the relative mouse movement. For example, in a specific embodiment the scrolling subsystem 308 may receive a signal that indicates that the mouse moved +1 in the x-direction when the cursor 310 was located on the right edge of the view 304. The scrolling subsystem 308 can be configured to send a message to the client subsystem 306 to pan the view +1 pixels on the x-axis. In this example the cursor 310 can may move another +1 pixels in the x-direction and the scrolling subsystem 308 can determine that the cursor 310 is on the new edge. Thus, if mouse is moved again to the right the scrolling subsystem 308 can be configured to send a signal to the client subsystem 306 to pan the view 304 again.

Figure 9:
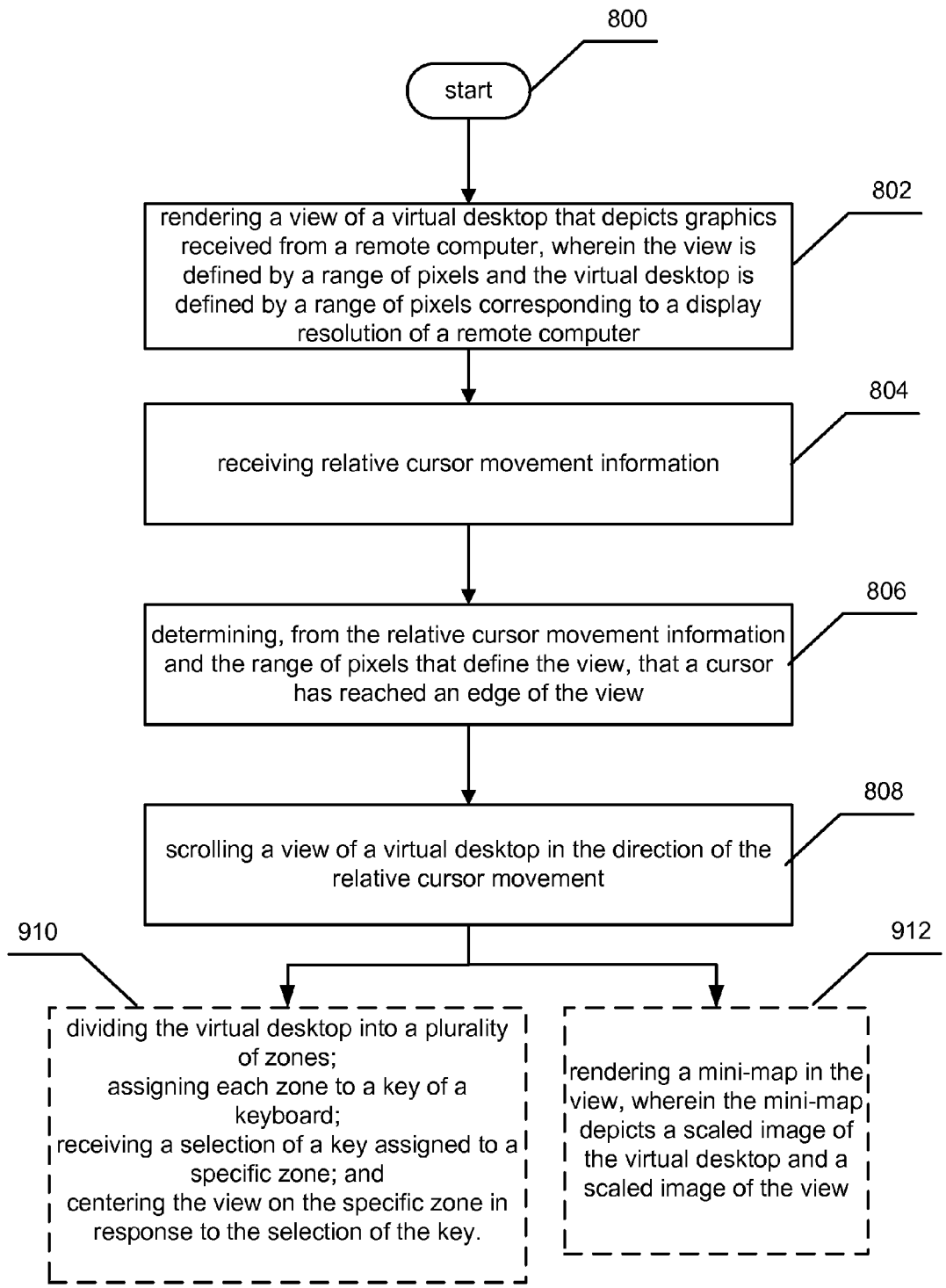
FIG. 9 depicts an alternative embodiment of the operational procedure 800 of FIG. 8.

Referring now to FIG. 9 though 11, they depict alternative embodiments of the operational procedure of FIG. 8. Referring now to FIG. 9, it depicts the operational procedure 800 of FIG. 8 including the additional operational procedures 910 and 912. Operation 910 illustrates dividing the virtual desktop into a plurality of zones; assigning each zone to a key of a keyboard; receiving a selection of a key assigned to a specific zone; and centering the view on the specific zone in response to the selection of the key. For example, in an embodiment of the present disclosure the remote display subsystem 254 of server 204 can be configured to generate a signal that defines the geometry of the virtual desktop and the server 204 can be configured to transmit a signal indicative of the geometry information to the client 201. In this example embodiment, the client subsystem 306 can be configured to generate the virtual desktop 302 in memory and transmit a signal indicative of the geometry to the scrolling subsystem 308. In this example embodiment the scrolling subsystem 308 can be configured to divide the virtual desktop 302 into a plurality of zones where each zone can be assigned a range of pixels. Once the virtual desktop is divided up into a plurality of zones identifiers for the zones can be stored in a table and associated with a key on a keyboard. For example, in the instance that the virtual desktop 302 is divided into four zones, the keys '9', '7' '1', and '3' could be used to correspond to four quadrants of the of the virtual desktop 302. In this example, if the scrolling subsystem 308 receives a notification that includes a '9', '7' '1', and '3' while, for example, the control key is held down, the scrolling subsystem 308 can be configured to send a signal to the client subsystem 306 directing it to center the view 304 on the pixel that defines the center of the selected zone.

Continuing with the description of FIG. 9, operation 912 illustrates rendering a mini-map in the view, wherein the mini-map depicts a scaled image of the virtual desktop and a scaled image of the view. For example, in an embodiment of the present disclosure the client subsystem 306 can be configured to generate a mini-map 316 that depicts a scaled image of the virtual desktop 302 and the view 304 to illustrate the portion of the virtual desktop 302 that the view 304 is rendering. For example, in an embodiment that includes a mini-map 316, the client subsystem 306 can be configured to receive a range of pixels that define the virtual desktop 302; and the range of pixels that define the view 304 relative to the virtual desktop 302. In this example embodiment the client subsystem 306 can be configured to generate a mini-map 316 by dividing the pixel ranges for both the view 304 and the virtual desktop 302 and determining the center for the scaled view that corresponds to the pixel coordinates of the center of the view 304 in the virtual desktop 302. In this example embodiment the client subsystem 306 can configure the display driver of client 201 to render a mini-map 316 that displays the location of the view 304 over a portion of the view 304. In this example embodiment as the view 304 is scrolled the range of pixels that define the view 304 can be updated and the client subsystem 306 can configure the display driver of client 201 to render an updated mini-map 316 that reflects that the view 304 changed.

In another embodiment of the present disclosure the mini-map 316 can be configured to render scaled images received from the server 204 in addition to a scaled view and scaled virtual desktop 302. For example, each window, and/or icon draw command received from the server 204 can be associated with a pixel location in the virtual display 302. In this example embodiment the client subsystem 306 can be configured to scale the windows and/or icons and determine the pixel location for the scaled windows and/or icons in the scaled virtual desktop 302. In this example embodiment the client subsystem 306 can configure the display driver of client 201 to render a mini-map 316 that includes scaled icons and/or windows over a portion of the view 304.

Figure 10:
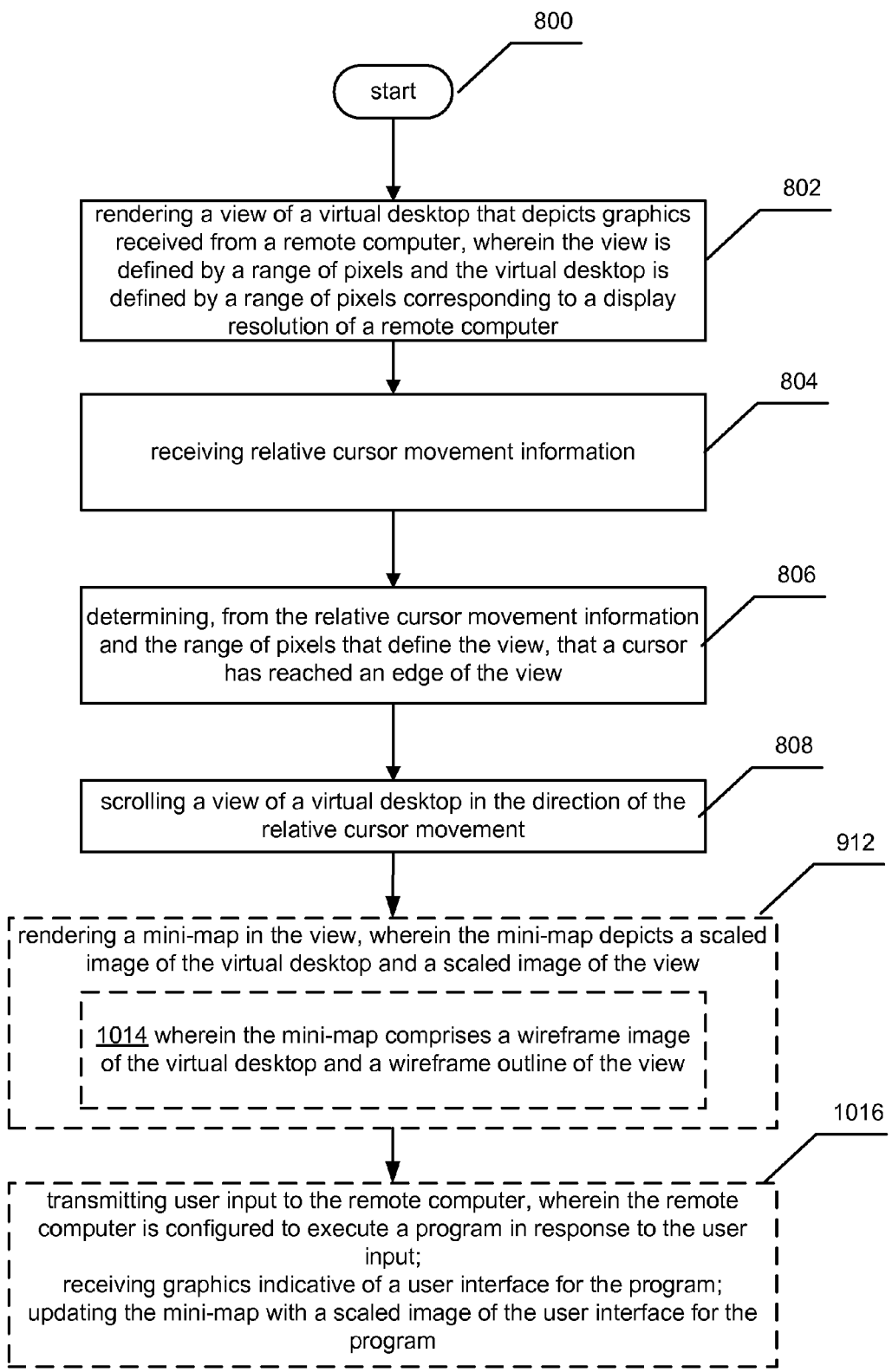
FIG. 10 depicts an alternative embodiment of the operational procedure 800 of FIG. 9.

Referring now to FIG. 10, it depicts an alternative embodiment of the operational procedure 800 of FIG. 9 including a refinement 1014 of the operational procedure, and additional operational procedure 1016. Referring to refinement 1014, it illustrates rendering a mini-map in the view, wherein the mini-map comprises a wireframe image of the virtual desktop and a wireframe outline of the view. For example, in an embodiment of the present disclosure the mini-map 316 can render a solid or translucent image of the view and virtual desktop over the view 304, however in an embodiment in order to conserve computational power the client subsystem 306 can be configured to generate a wireframe of the view 304 and the virtual desktop 302. For example, a wireframe in an embodiment can include a visual presentation of created by identifying the edges of the view and virtual desktop defined by ranges of pixels.

Continuing with the description of FIG. 10, operation 1016 illustrates transmitting user input to the remote computer, wherein the remote computer is configured to execute a program in response to the user input; receiving graphics indicative of a user interface for the program; and updating the mini-map with a scaled image of the user interface for the program. For example, in an embodiment of the present disclosure a network adaptor of the client 201 can be configured to transmit one or more packets indicative of the coordinates of the cursor 310 with respect to the virtual desktop 302 and user input such as a double mouse click. In this example, and referring to FIG. 2, the user input can be received by the stack instance associated with the session and forwarded to the input subsystem 252. The input subsystem 252 can determine that the coordinates of the hotspot of the cursor 310 are where an icon for a program is located. The session core 244 can send a signal to the runtime subsystem 240 that includes a handle to the identified program. The runtime subsystem 240 can execute a process that can instantiate one or more threads for the program. The threads can be scheduled by the kernel 214 of the server operating system 214 to be processed by the processor of the server 204 and a user interface indicative of the program can be generated by GDI 246. In this example, the remote display subsystem 254 can be configured to receive the draw commands indicative of the user interface and route them to the stack instance for the session. The transport logic 210 can then transmit the packets to the client 201. Referring now to FIG. 3, once the client subsystem 306 receives the packets, it can be configured to identify the coordinates for the user interface and draw the user interface in the virtual desktop 302. In this example, the client subsystem 306 can be configured to receive the range of pixels that define the virtual desktop 302; the range of pixels that define the view relative to the virtual desktop 302; and the range of pixels that define the user interface for the program. In this example embodiment the client subsystem 306 can be configured to generate a mini-map 316 by dividing the pixel ranges for the virtual desktop and the scaled user interface for the program; and determine the center for the scaled user interface for the program. In this example embodiment the client subsystem 306 can configure the display driver of client 201 to render a mini-map 316 over a portion of the view 304 that includes a scaled user interface for the program, or for example, a wireframe of the scaled user interface for the program. In another embodiment the client subsystem 306 can be configured to change the color of the scaled user interface for a predetermined amount of time in order to allow a user to quickly identify where the user interface was rendered on the virtual desktop 302.

Figure 11:
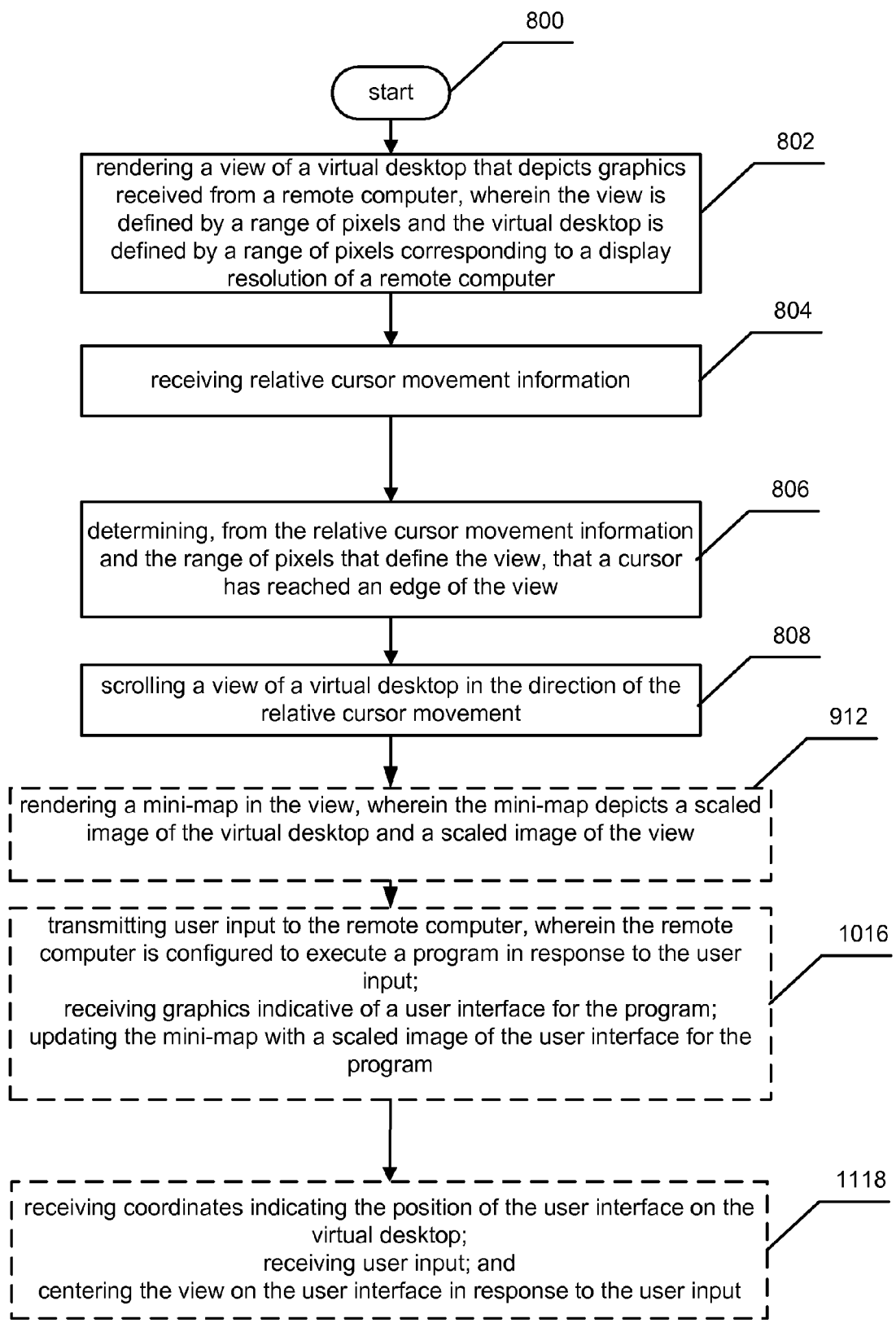
FIG. 11 depicts an alternative embodiment of the operational procedure 800 of FIG. 10.

Referring now to FIG. 11, it depicts an alternative embodiment of the operational procedure 800 of FIG. 10 including operational procedure 1118 that illustrates receiving coordinates indicating the position of the user interface on the virtual desktop; receiving user input; and centering the view on the user interface in response to the user input. For example, in an embodiment when new window or a user interface for a program is drawn by the client subsystem 306 a notification can be sent to the scrolling subsystem 308 that identifies the coordinates of the window or user interface. In this embodiment a handle representative of the coordinates can be stored in a table and user input such as a key, or a mouse button can be associated with the handle. In this example embodiment, the scrolling subsystem 308 can be configured to receive notifications related to user input and determine from received user input whether the key, or mouse button associated with the handle was selected. In the instance that it is selected, the scrolling subsystem 308 can send a signal to the client subsystem 306 directing it to center the view 304 on the coordinates of the new window or user interface for the program. In this example the client subsystem 306 can receive the message and direct the display driver to center the view 304.

Figure 12:
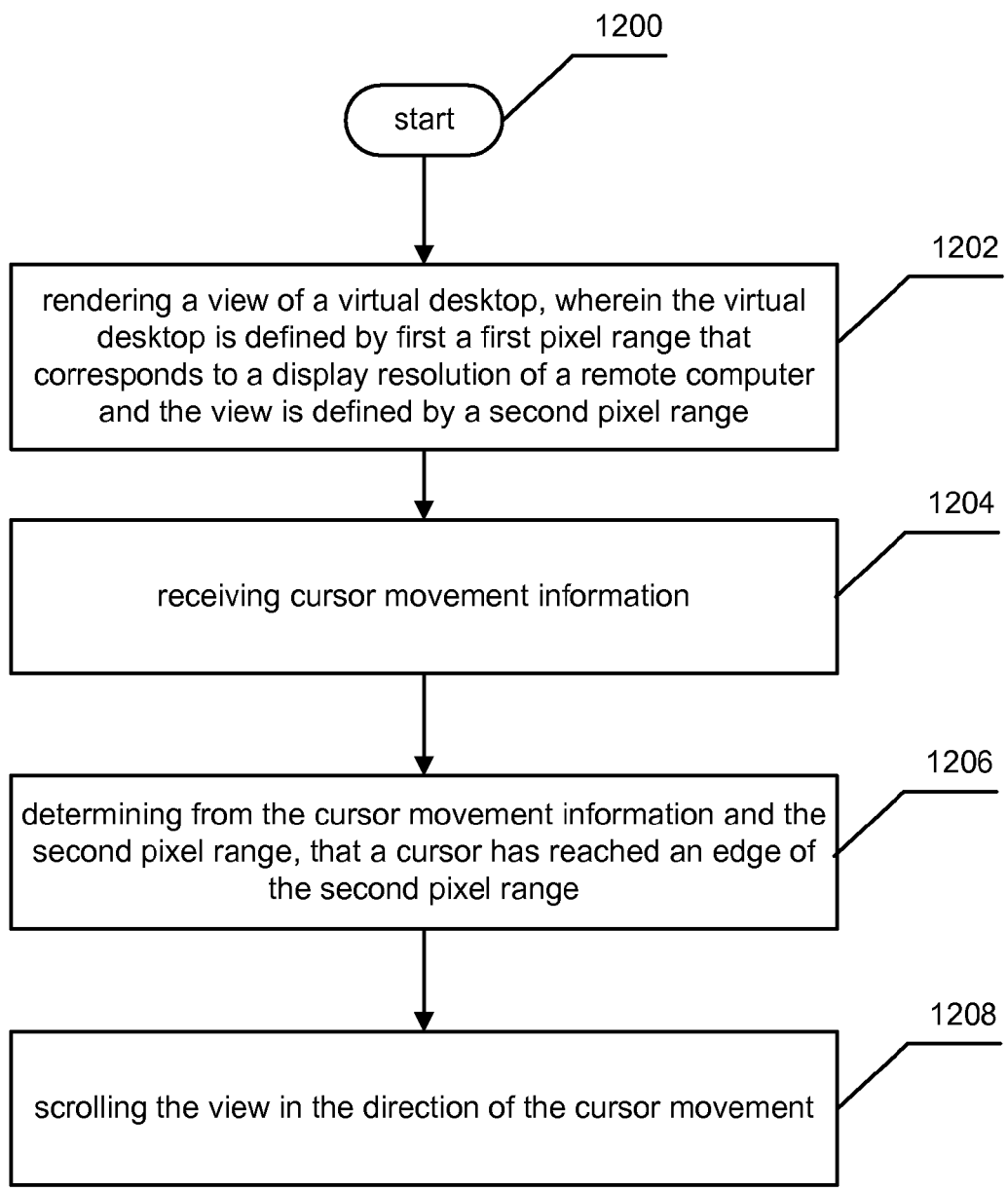
FIG. 12 depicts is an example flowchart for practicing aspects of the present disclosure.

Referring now to FIG. 12, it illustrates an example flowchart for practicing aspects of the present disclosure including the operations 1200, 1202, 1204, and 1206. In an embodiment of the present disclosure a computer system can include circuitry, e.g., a combination of hardware and software configured to effectuate the operational procedures of FIG. 12. Referring now to FIG. 12 in conjunction FIG. 3, operation 1200 begins the operational procedure and operation 1200 illustrates rendering a view of a virtual desktop, wherein the virtual desktop is defined by first a first pixel range that corresponds to a display resolution of a remote computer and the view is defined by a second pixel range. For example, in an embodiment of the present disclosure a client 201 can be configured to include an operating system 312 that has a kernel 314. The kernel 314 can be configured to manage the hardware of the client 201 and schedule threads for executing on a processor. The operating system 312 can be configured to include a user mode and a kernel mode, e.g., a non-privileged processor mode that applications run in that has a limited number of rights, and a privileged mode of code execution in a processor in which all memory and CPU instructions can be issued. The kernel 314 in this example can interface with a client subsystem 306 that can include one or more processes the effectuate a remote desktop environment by receiving draw commands from a server 204 and directing a display driver to draw them to a virtual desktop 302 stored in memory. Similar to that described above, the virtual desktop 302 can be generated by the client subsystem 306 and the range of pixels of the virtual desktop 302 can correspond to a display resolution of a display driver of a server 204. For example, in this embodiment a server 204 may include a display driver that is configured to generate a display resolution of 1280 by 1024. In this example the virtual desktop 302 can be generated to include a display resolution of 1280 by 1024. In another embodiment the server 204 may include two display drivers that each generate a display resolution of 1280 by 1024. In this example the virtual desktop 302 can be configured to include a display resolution of 2560 by 1024. In example an embodiment where the display resolution of the server 204 is kept the same on the client 201, the client subsystem 306 can render images without performing costly resizing and remapping operations, i.e., since the geometry of the virtual desktop 302 is the same as the display driver of the server 204 an icon is located at the coordinates (1000, 900) on the server 204 can drawn at the same coordinates of the client 201 without resizing and remapping the icon.

In addition to drawing a virtual desktop 302, the client subsystem 306 can be configured to direct a display driver to render a view 304 of the virtual desktop 302. In this example embodiment the view 304 can be defined by a second pixel range and a display driver of the client 201 can be configured to render the images in the viewed portion of the virtual desktop 302. In this example embodiment the pixel range that defines the view 304 can be less than the pixel range that defines the virtual desktop 302. For example, in an embodiment the client 201 can be a laptop computer that has a screen that can render 1280 by 1024 pixels whereas the server 204 has multiple monitors that are each rendering 1280 by 1024 pixels (thus the server 204 essentially has 5120 by 1024 pixels of real estate). In another example, the view 304 can be an adjustable window on the desktop of the client 201. Thus in an embodiment both the server 204 and the client may have a display resolution of 1280 by 1024, however since the view 304 is windowed it may include 600 by 400 pixels at the moment and the client 201 may have a user interface for another program rendered by the remaining pixels.

In an embodiment of the present disclosure the range of pixels that define the view 304 can be mapped to the range of pixels that define the virtual desktop 302. For example, the client subsystem 306 can be configured to include a table that includes information that states that the current pixel range of the view 304. In a specific example, if a view of a virtual desktop has a pixel range of 800 by 600 and the view 304 is rendering the upper right most portion of the virtual desktop 302, the table can include information that states that the current pixel range of the view 304 is from pixel 1280 to 480 on the x-axis and from 1024 to 424 on the y-axis. In another implantation the table may only include a single point such as the upper right pixel of the view (1280, 1024) and use the point along with the display resolution of the view 304 to calculate the pixels that define the edges.

Continuing with the description of FIG. 12, it includes operation 1204 that illustrates receiving cursor movement information. For example, and in addition to the previous example the scrolling subsystem 308 can be configured in an embodiment of the present disclosure to receive cursor movement information from an operating system 312 of the client 201. For example, in an embodiment the operating system 312 can be configured to track the movement of a cursor 310. The cursor 310 in an embodiment can contain a single-pixel point called the hotspot, e.g., a point that the operating system 312 tracks and recognizes as the position of the cursor 310. In this example implementation, the scrolling subsystem can 308 be configured to receive input messages that identify the absolute position of the cursor 310 relative to the virtual desktop 302 and compare the position to a previous position of the cursor 310 to determine the direction the cursor moved relative to the virtual desktop 302. In an alternative embodiment the input messages can include relative mouse movement information. For example, in an embodiment the operating system 312 of the client 201 can be configured to track each time an input device, e.g., a mouse, or touchpad is physically moved. The input messages in this example can include information such as (+1,+1) in the event that the input device was moved up and to the right. In other example embodiments the scrolling subsystem 308 can be configured to receive both absolute and relative mouse movement information.

Continuing with the description of FIG. 12, it includes operation 1206 that illustrates determining from the cursor movement information and the second pixel range, that a cursor has reached an edge of the second pixel range. For example, in an embodiment of the present disclosure the scrolling subsystem 308 can be configured to receive information that identifies pixel ranges of the view 304 relative to the virtual desktop 302, and the current location of the cursor 310. The scrolling subsystem 308 can additionally be configured to receive messages that can, for example, include absolute mouse movement information and/or relative mouse movement information. The scrolling subsystem 308 can the determine whether the cursor 310 has reached an edge of the view 304 by determining the position of the cursor 310 relative to the virtual desktop 302 and comparing the position to pixel ranges that define the view 304 relative to the virtual desktop 302, e.g., by comparing the x and y coordinates of the cursor 310 relative to the virtual desktop 302 to the x and y coordinates that defines the edges of the view 304 relative to the virtual desktop 302 each time a mouse movement message is received. In a specific example the scrolling subsystem 308 can include a table that includes the coordinates of the cursor 310 in the virtual desktop, e.g., pixel 400 by 300 and the pixels that define the view of the virtual desktop, e.g., pixels 0 to 800 on the x-axis and 0 to 600 on the y-axis. As the user moves a mouse the cursor 310 can move from, for example, left to right across the view 304. The scrolling subsystem 308 can increment the pixel position of the cursor 310 and for each increment check to see whether the pixel has reached an edge, e.g., x-axis pixels 800 in this example. In the instance that the scrolling subsystem 308 determines that the x-axis edge is reached, e.g., the cursor 310 is located at pixel point 800 by 300, the scrolling subsystem 308 can be configured to send a message to the client subsystem 306.

Continuing with the description of FIG. 12, it includes operation 1206 that illustrates scrolling the view in the direction of the cursor movement. For example, and in addition to the previous example in the instance that the scrolling subsystem 308 determines that an edge of the view 304 has been reached, the scrolling subsystem 308 can be configured to send a signal to the client subsystem 306 to pan the view 304 in the direction of the mouse movement. For example, in a specific embodiment the scrolling subsystem 308 may receive a signal that indicates that the mouse moved (−10, 0) on the x-axis. The scrolling subsystem 308 can be configured to change the position of the cursor 310 and compare the position to the pixels that define the edges of the view 304. In this example the left edge of the view 304 may be reached and the scrolling subsystem 308 can be configured to send a message to the client subsystem 306 directing it to move the view 304 of the virtual desktop 302. In a specific example the view 304 can include a resolution of 800 by 600 pixels and can depict the upper right most portion of the virtual desktop 302. The client subsystem 306 can in this example include a table that stores the coordinates that define the view, e.g., 1280 to 480 in the x-axis and 1024 to 424 in the y-axis. In this example embodiment, if the scrolling subsystem 308 determines that the view 304 should be moved (−10,0) then the client subsystem 306 can be configured to direct the display driver to render the pixel range 1270 to 470 in the x-axis and 1024 to 424 in the y-axis.

Figure 13:
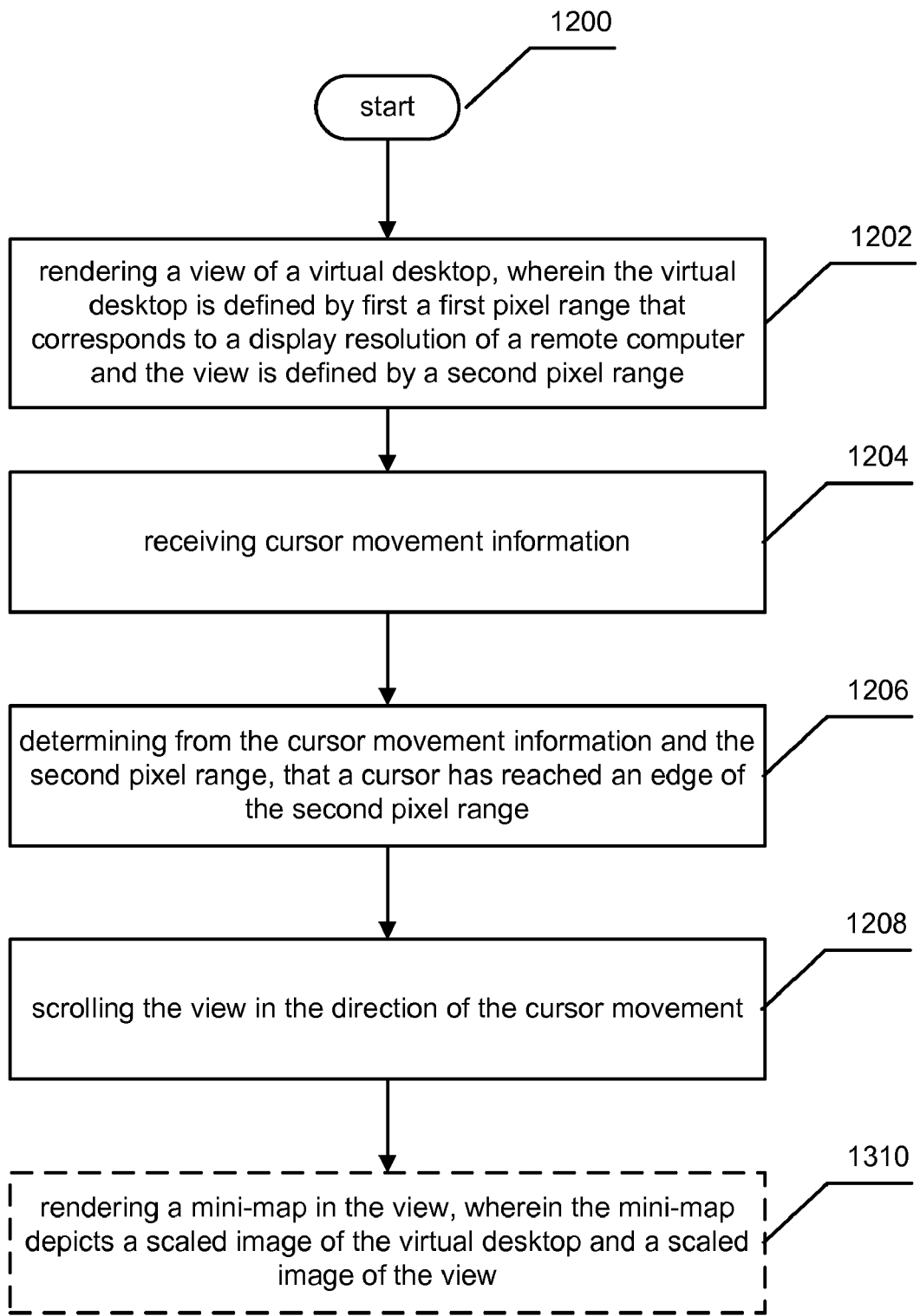
FIG. 13 depicts an alternative embodiment of the operational procedure 1200 of FIG. 12.

Referring now to FIG. 13-16 they illustrate example refinements to the operational procedure 1200 of FIG. 12 and additional operational procedures. Referring now to FIG. 13, it illustrates the operational procedure of FIG. 12 including the additional operation 1308 that illustrates rendering a mini-map in the view, wherein the mini-map depicts a scaled image of the virtual desktop and a scaled image of the view. For example, in an embodiment of the present disclosure the client subsystem 306 can be configured to generate a mini-map 316 that depicts a scaled image of the virtual desktop 302 and the view 304 to illustrate the portion of the virtual desktop 302 that the view 304 is depicting. For example, in an embodiment that includes a mini-map 316, the client subsystem 306 can be configured to receive a range of pixels that define the virtual desktop 302; and the range of pixels that define the view 304 relative to the virtual desktop 302. In this example embodiment the client subsystem 306 can be configured to generate a mini-map 316 by dividing the pixel ranges for both the view 304 and the virtual desktop 302 and determining the center for the scaled view that corresponds to the pixel coordinates of the center of the view 304 in the virtual desktop 302. In this example embodiment the client subsystem 306 can configure the display driver of client 201 to render a mini-map 316 that displays the location of the view 304 over a portion of the view 304. In this example embodiment as the view 304 is scrolled the range of pixels that define the view 304 can be updated and the client subsystem 306 can configure the display driver of client 201 to render an updated mini-map 316 that reflects that the view 304 changed.

In another embodiment of the present disclosure the mini-map 316 can be configured to render scaled images received from the server 204 in addition to a scaled view and scaled virtual desktop 302. For example, each window, and/or icon draw command received from the server 204 can be associated with a pixel location in the virtual desktop 302. In this example embodiment the client subsystem 306 can be configured to scale the windows and/or icons and determine the pixel location for the scaled windows and/or icons in the scaled virtual desktop. In this example embodiment the client subsystem 306 can configure the display driver of client 201 to render a mini-map 316 that includes scaled icons and/or windows over a portion of the view 304.

In yet another embodiment of the present disclosure the mini-map 316 can render a solid or translucent image of the view and virtual desktop over the view 304, however in an embodiment in order to conserve computational power the client subsystem 306 can be configured to generate a wireframe of the view 304 and the virtual desktop 302. For example, a wireframe in an embodiment can include a visual presentation of created by identifying the edges of the view and virtual desktop defined by ranges of pixels.

Figure 14:
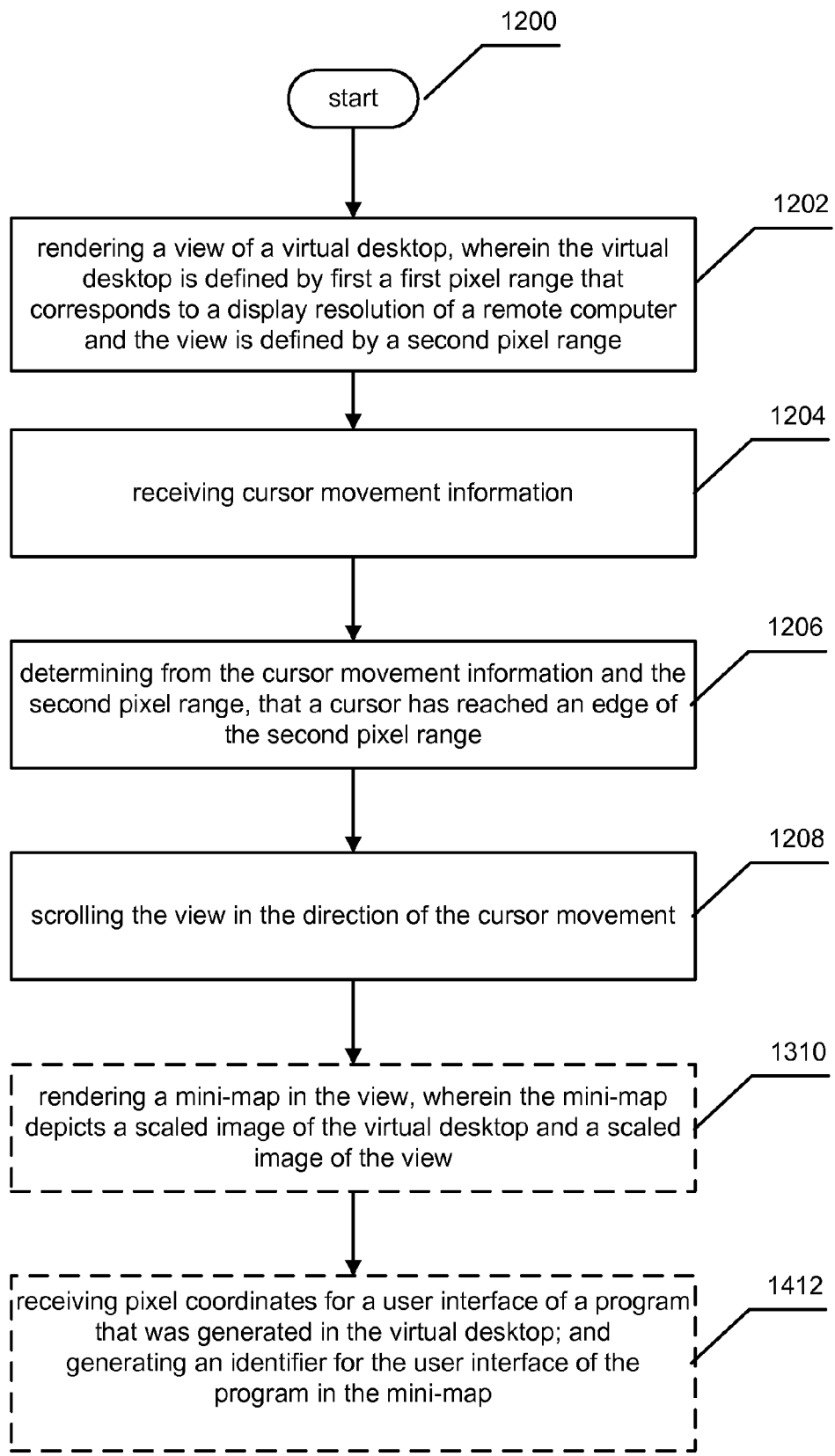
FIG. 14 depicts an alternative embodiment of the operational procedure 1200 of FIG. 13.

Referring now to FIG. 14, it illustrates the operational procedure of FIG. 13 including the additional operation 1410 that illustrates receiving pixel coordinates for a user interface of a program that was generated in the virtual desktop; and generating an identifier for the user interface of the program in the mini-map. For example, in an embodiment of the present disclosure a network adaptor of the client 201 can be configured to receive a signal from the server 204 that identifies the coordinates for a user interface of a program. The client subsystem 306 can receive the signal and direct the display driver of the client 201 to render an identifier on the mini-map 316 that can be used to quickly determine what portion of the virtual desktop 302 the user interface was drawn. For example, the runtime subsystem 240 of the server 204 can be configured to generate processes and threads for programs. In this example embodiment the remote display subsystem 254 can be configured to receive a notification when a process is started and information that identifies the coordinates of the user interface for the program from the GDI 246 for example. The remote display subsystem 254 can be configured to generate a message that identifies the pixel range, or a pixel point for the newly generated user interface and send a signal to the client 201 via the transport logic 210. The client subsystem 306 can be configured to receive the message and direct the display driver of client 201 to render a mini-map 316 over a portion of the view 304 that includes a scaled user interface, or for example, a wireframe of the scaled user interface. The client subsystem 306 can then configure the display driver to change the color of the scaled user interface for a predetermined amount of time in order to allow a user to quickly identify where the user interface was rendered on the virtual desktop 302.

Figure 15:
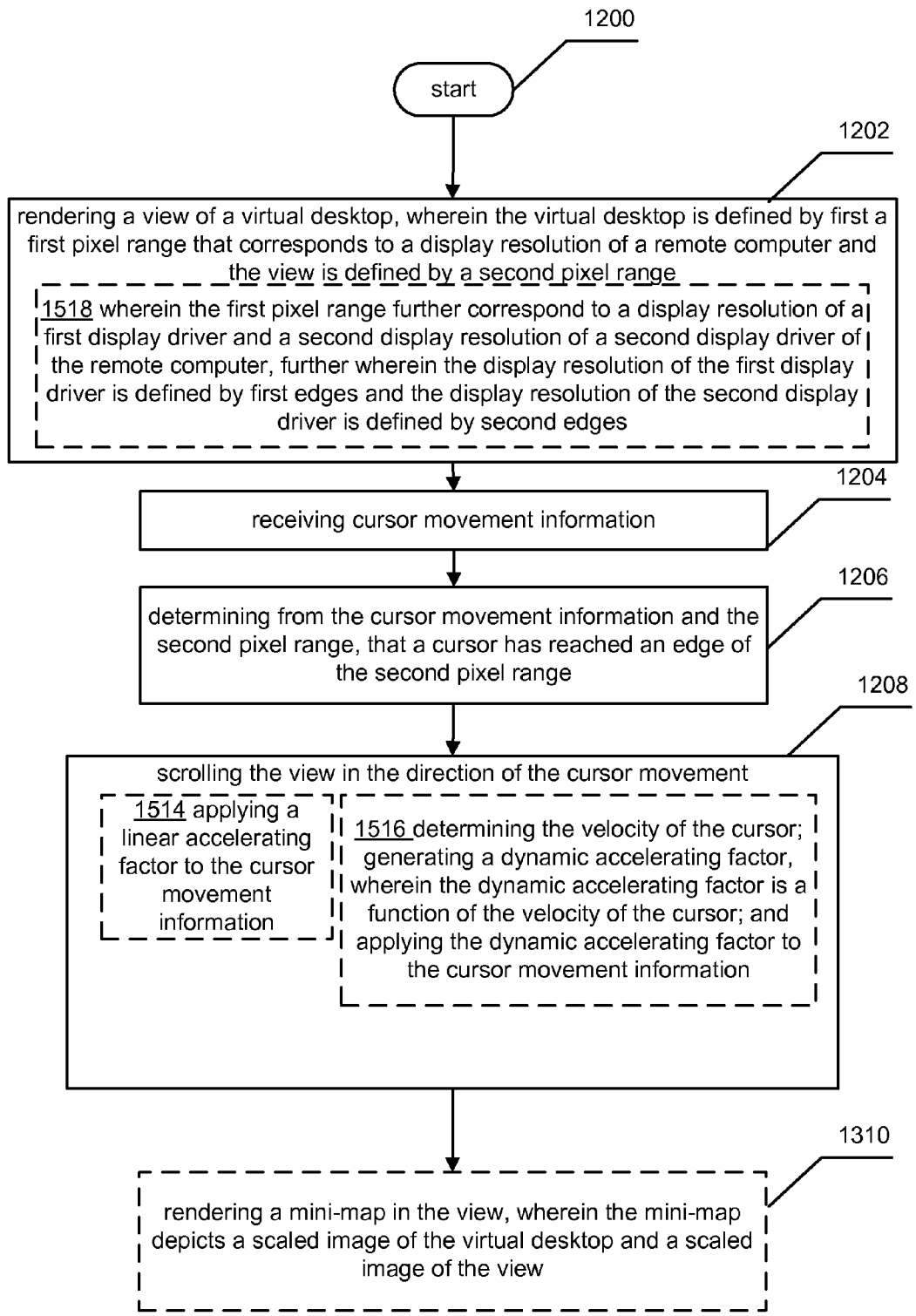
FIG. 15 depicts an alternative embodiment of the operational procedure 1200 of FIG. 12.

Referring now to FIG. 15, it illustrates the operational procedure of FIG. 12 including the additional operations 1512 and 1514 and refinement 1516. Continuing with the description of FIG. 12, operation 1512 illustrates applying a linear accelerating factor to the cursor movement information. For example, in an embodiment of the present disclosure the scrolling subsystem 308 can be configured to receive cursor movement information; multiply it by a scaling value; and transmit a signal to the client subsystem 306 to scroll the view 304 the amount defined by the scaled value. For example, in an embodiment in may be desirable to pan the view 304 a greater number of pixels than the amount of relative mouse movement, e.g., in example embodiments where the client 201 includes a touchpad the user may have to scroll their finger across the touchpad an unreasonable amount of times to move the view 304 from one side of a virtual desktop 302 to another. Thus, in an embodiment the scrolling subsystem 308 can multiple the relative movement information by a fixed value and direct the client subsystem 306 to move the view 304 the scaled amount. In a specific example the scrolling subsystem 308 can be configured to determine that the cursor position is on a pixel that defines the right edge of the view 304. In this example if the user moves the mouse +1 in the x-direction the scrolling subsystem 308 can multiply the pixel movement by a fixed number such as 50 and send a message to the client subsystem 306 to move pan the view 304 50 pixels in the x-direction.

Continuing with the description of FIG. 15, it additionally depicts operation 1514 that illustrates determining the velocity of the cursor; generating a dynamic accelerating factor, wherein the dynamic accelerating factor is a function of the velocity of the cursor; and applying the dynamic accelerating factor to the cursor movement information. For example, in an embodiment of the present disclosure the scrolling subsystem 308 can be configured to receive relative cursor movement information; multiply it by a dynamic scaling value; and transmit a signal to the client subsystem 306 to scroll the view 304 in amount defined by the scaled value. For example, in an embodiment it may be desirable to pan the view 304 a large number of pixels in the instance that the cursor 310 is moved across the view 304 quickly. For example, if a user moves a cursor 310 across a view 304 it can be inferred that the user is interested in manipulating something on the far end of the virtual desktop 302. In this example, the scrolling subsystem 308 can be configured to infer that the user's intent is to pan the view 304 a large amount of pixels and react accordingly. In these situations the scrolling subsystem 308 can be configured to generate a scaling value that is dependent on the velocity of the cursor 310 as it moves across the view 304. For example, in this example the scrolling subsystem 308 can be configured to track the coordinates of the cursor 310 over the last 64 samples. In this example the sampling rate may be constant and the scrolling subsystem 308 can be configured to determine the average velocity of the cursor 310. In this example the scrolling subsystem 308 can be configured to increase the scaling value based on the average velocity of the cursor 310 and direct the client subsystem 306 to pan the view 304 the scaled amount. For example, in a certain example embodiment the scaling value can exponentially increase with velocity. Thus, the faster that the cursor 310 moves in the view 304 the more of the view 304 will be scrolled by the client subsystem 306. In a specific embodiment, the cursor 310 may move from left to right across the view 304. In this example the scrolling subsystem 308 may receive a number of messages that indicate that the coordinates of the cursor 310 are changing in the x-direction at +10 a sample. In this embodiment, the scrolling subsystem 308 could be configured to determine a dynamic accelerating factor by taking e^10 and direct the client subsystem 306 to move the view 304 22,026 pixels in the x-direction. In the same or other embodiments the scrolling subsystem 308 can be configured to set a maximum dynamic value such as 403, thus in this situation the client subsystem 306 may not massively change the view 304 by scrolling thousands of pixels.

Continuing with the description of FIG. 15, it additionally depicts refinement 1516 of the operational procedure of FIG. 12, wherein the first pixel range further correspond to a display resolution of a first display driver and a second display resolution of a second display driver of the remote computer, further wherein the display resolution of the first display driver is defined by first edges and the display resolution of the second display driver is defined by second edges. For example, in an embodiment of the present disclosure the server 204 can include a remote display subsystem 254 that includes at least two display drivers. In this example each display driver can have its own display resolution and can be configured to transmit signals indicative of the images on their display to the client 201 via the transport logic 210. In this example embodiment a first display driver may be configured to operate at a display resolution of 1280 by 1024 pixels and the second display driver may operate at a resolution of 800 by 600 pixels. In this example embodiment the client subsystem 306 of FIG. 3 can be configured to receive individual streams of data for each display; generate a virtual desktop 302 that includes the sum of the display resolutions and remap the pixel ranges of, for example, the second display driver to coincide with the virtual desktop 302. In this example embodiment the client subsystem 306 can use the range of pixels that define the first and second display resolutions to determine the edges for each display in the virtual desktop 302. For example, the client subsystem 306 can include a table that associates the pixel range for each display to a pixel range for the entire virtual desktop 302. In an embodiment where the display resolution for the first display driver is 1280 by 1024 and the second is 800 by 600, if the physical layout of the display drivers is set to have the second display logically to the right of the first then the table can map pixels for the second display driver to the pixels numbers 1280 to 2080 in the x-axis and, for example, either 0 to 600 or 424 to 1024 in the y-axis of the virtual display 302 depending on the vertical alignment of the second display driver.

Figure 16:
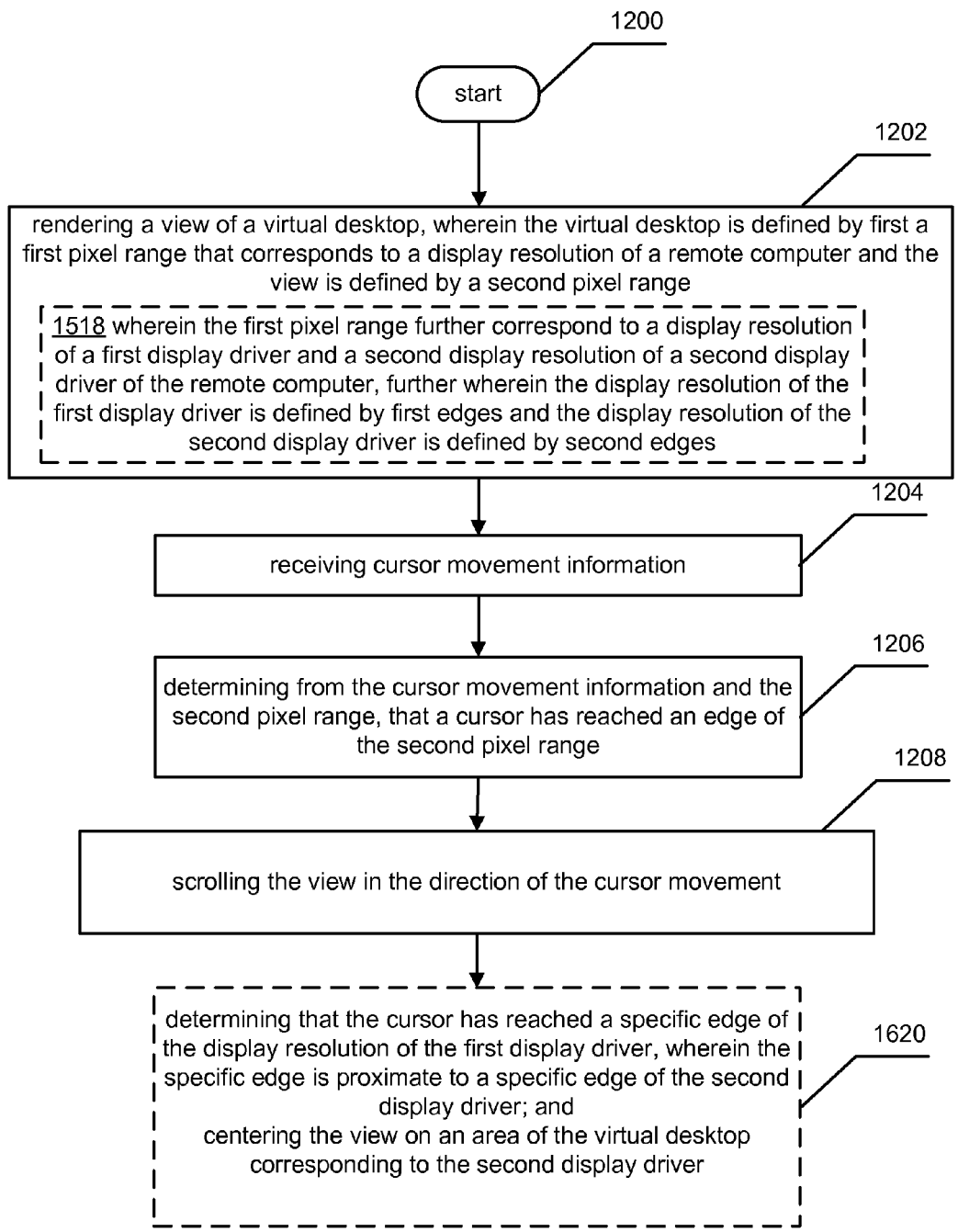
FIG. 16 depicts an alternative embodiment of the operational procedure 1200 of FIG. 15.

Referring now to FIG. 16, it illustrates an alternative embodiment of the operational procedures of FIG. 15 including the additional operation 1618 that illustrates determining that the cursor has reached a specific edge of the display resolution of the first display driver, wherein the specific edge is proximate to a specific edge of the second display driver; and centering the view on an area of the virtual desktop corresponding to the second display driver. For example, in an embodiment of the present disclosure the scrolling subsystem 308 can be configured to include the pixel ranges of each display driver in relation to the mapped pixel ranges of the virtual display 302. In this example embodiment the scrolling subsystem can be configured to receive cursor movement information from the operating system 312 of the client 201; and store the coordinates of the cursor 310 relative to the virtual desktop 302. In this example embodiment the position of the cursor 310 relative to virtual desktop 302 can be tracked and if the cursor 310 reaches the edge of a display driver, e.g., in the x direction pixel 1280, the scrolling subsystem 308 can be configured to send a message to the client subsystem 306 to direct the display driver to display a range of pixels centered on the virtual desktop pixels that correspond to the second display.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

What is claimed:

1. A method for navigating a virtual desktop, the method comprising:

receiving, from a remote computer, information describing a bounding box, the bounding box defining a size of a virtual desktop, the size of the virtual desktop based on both first display resolution information of a first display driver on the remote computer and second display resolution information of a second display driver on the remote computer and a relationship that defines how images generated by the first display driver are displayed relative to images generated by the second display driver;

generating the virtual desktop in accordance with the received information describing the bounding box;

drawing graphics received from the remote computer in the virtual desktop;

rendering a view of the virtual desktop, wherein the view is defined by edges and depicts a portion of the virtual desktop;

receiving relative cursor movement information;

determining, from the relative cursor movement information and the edges of the view, that a cursor has reached an edge of the view;

scrolling the view of the virtual desktop in the direction of the relative cursor movement;

determining, from the edges that define the view and edges that define the first display resolution information and the second display resolution information, that an edge of the view has reached an edge of the first display resolution information; and in response to determining that the velocity of the cursor is greater than a predetermined value, scrolling the view of the virtual desktop to a far edge associated with the second display resolution information.

2. The method of claim 1, further comprising:
applying a linear accelerating factor to the relative cursor movement information.

3. The method of claim 1, further comprising:
determining the velocity of the cursor;
generating a dynamic accelerating factor, wherein the dynamic accelerating factor is a function of the velocity of the cursor; and
applying the dynamic accelerating factor to the relative cursor movement information.

4. The method of claim 1, further comprising:
determining, from coordinate information for the cursor and the edges that define the first and second display drivers, that the cursor has reached an edge of the first display driver; and
generating a haptic response.

5. The method of claim 1, wherein scrolling the view of the virtual desktop to a far edge associated with the second display resolution information comprises:
jumping the view of the virtual desktop to the far edge.

6. A computer readable storage medium including computer readable instructions for navigating a virtual desktop, the computer readable storage medium comprising:
instructions for receiving, from a remote computer, information describing a bounding box, the bounding box defining a size of a virtual desktop, the size of the virtual desktop based on both first display resolution information of a first display driver on the remote computer and second display resolution information of a second display driver on the remote computer and a relationship that defines how images generated by the first display driver are displayed relative to images generated by the second display driver;
instructions for generating the virtual desktop in accordance with the received information describing the bounding box;
instructions for drawing graphics received from the remote computer in the virtual desktop;
instructions for rendering a view of a virtual desktop that depicts graphics received from a remote computer, wherein the view is defined by a range of pixels and the virtual desktop is defined by a range of pixels corresponding to a display resolution of a remote computer;
instructions for receiving relative cursor movement information;
instructions for determining, from the relative cursor movement information and the range of pixels that define the view, that a cursor has reached an edge of the view;
instructions for scrolling a view of a virtual desktop in the direction of the relative cursor movement;
instructions for, in response to determining that the velocity of the cursor is greater than a predetermined value, scrolling the view of the virtual desktop to a far edge associated with the second display resolution information.

7. The computer readable storage medium of claim 6, further comprising:
instructions for dividing the virtual desktop into a plurality of zones;
instructions for assigning each zone to a key of a keyboard;
instructions for receiving a selection of a key assigned to a specific zone; and
instructions for centering the view on the specific zone in response to the selection of the key.

8. The computer readable storage medium of claim 6, further comprising:
instructions for rendering a mini-map in the view, wherein the mini-map depicts a scaled image of the virtual desktop and a scaled image of the view.

9. The computer readable storage medium of claim 8, wherein the mini-map comprises a wireframe image of the virtual desktop and a wireframe outline of the view.

10. The computer readable storage medium of claim 8, further comprising:
instructions for transmitting user input to the remote computer, wherein the remote computer is configured to execute a program in response to the user input;
instructions for receiving graphics indicative of a user interface for the program;
instructions for updating the mini-map with a scaled image of the user interface for the program.

11. The computer readable storage medium of claim 10, further comprising:
instructions for receiving coordinates indicating the position of the user interface on the virtual desktop;
instructions for receiving user input; and
instructions for centering the view on the user interface in response to the user input.

12. A computer system comprising:
circuitry for receiving, from a remote computer, information describing a bounding box, the bounding box defining a size of a virtual desktop, the size of the virtual desktop based on both first display resolution information of a first display driver on the remote computer and second display resolution information of a second display driver on the remote computer and a relationship that defines how images generated by the first display driver are displayed relative to images generated by the second display driver;
circuitry for generating the virtual desktop in accordance with the received information describing the bounding box;
circuitry for drawing graphics received from the remote computer in the virtual desktop;
circuitry for rendering a view of a virtual desktop, wherein the virtual desktop is defined by first a first pixel range that corresponds to a display resolution of a remote computer and the view is defined by a second pixel range;
circuitry for receiving cursor movement information;
circuitry for determining from the cursor movement information and the second pixel range, that a cursor has reached an edge of the second pixel range;
circuitry for scrolling the view in the direction of the cursor movement;
circuitry for, in response to determining that the velocity of the cursor is greater than a predetermined value, scrolling the view of the virtual desktop to a far edge associated with the second display resolution information.

13. The system of claim 12, further comprising:
circuitry for rendering a mini-map in the view, wherein the mini-map depicts a scaled image of the virtual desktop and a scaled image of the view.

14. The system of claim 13, further comprising:
circuitry for receiving pixel coordinates for a user interface of a program that was generated in the virtual desktop; and
circuitry for generating an identifier for the user interface of the program in the mini-map.

15. The system of claim 12, wherein the circuitry for scrolling the view further comprises:

circuitry for applying a linear accelerating factor to the cursor movement information.

16. The system of claim 12, wherein the circuitry for scrolling the view further comprises:
circuitry for determining the velocity of the cursor;
circuitry for generating a dynamic accelerating factor, wherein the dynamic accelerating factor is a function of the velocity of the cursor; and
circuitry for applying the dynamic accelerating factor to the cursor movement information.

17. The system of claim 12, further comprising:
circuitry for determining that the cursor has reached a specific edge of the display resolution of the first display driver, wherein the specific edge is proximate to a specific edge of the second display driver; and
circuitry for centering the view on an area of the virtual desktop corresponding to the second display driver.

\* \* \* \* \*